United States Patent
Kuvich

(10) Patent No.: US 7,668,797 B2
(45) Date of Patent: Feb. 23, 2010

(54) ACTIVE SEMIOTIC SYSTEM FOR IMAGE AND VIDEO UNDERSTANDING BY ROBOTS AND UNMANNED VEHICLES, METHODS AND APPARATUS

(76) Inventor: Gary Kuvich, 1943 E. 27th St., Brooklyn, NY (US) 11229

( * ) Notice: Subject to any disclaimer, the term of this patent is extended or adjusted under 35 U.S.C. 154(b) by 577 days.

(21) Appl. No.: 11/419,199

(22) Filed: May 18, 2006

(65) Prior Publication Data
US 2007/0239314 A1    Oct. 11, 2007

Related U.S. Application Data

(60) Provisional application No. 60/744,494, filed on Apr. 7, 2006.

(51) Int. Cl.
*G06F 15/18* (2006.01)
(52) U.S. Cl. .............. 706/62; 706/45; 706/46; 700/245; 700/246; 700/250; 700/258; 700/259
(58) Field of Classification Search ......... 706/14, 706/45–47, 55, 62; 700/245, 246, 250, 258, 700/259
See application file for complete search history.

(56) References Cited

U.S. PATENT DOCUMENTS

| 5,579,444 | A * | 11/1996 | Dalziel et al. ........... 700/259 |
| 6,879,946 | B2 * | 4/2005 | Rong et al. ................ 703/2 |
| 2002/0095276 | A1 * | 7/2002 | Rong et al. ................ 703/2 |
| 2004/0093122 | A1 * | 5/2004 | Galibraith ............... 700/245 |
| 2004/0153212 | A1 * | 8/2004 | Profio et al. ............ 700/245 |
| 2005/0197739 | A1 * | 9/2005 | Noda et al. .............. 700/245 |
| 2005/0222713 | A1 * | 10/2005 | Kawabe et al. .......... 700/259 |
| 2006/0126918 | A1 * | 6/2006 | Oohashi et al. ......... 382/153 |
| 2007/0078564 | A1 * | 4/2007 | Hoshino et al. ......... 700/245 |

OTHER PUBLICATIONS

Palm et al. "Behavior Sampling: A Recording Mechanism for Visually Based Teleoperation", IEEE, 1998, pp. 1753-1760.*
Vu, A. S., "A Computer Vision System . . . ", Proceedings of the 10th International Conference on Image Analysis and Processing, pp. 636-641, 1999, Germany.

(Continued)

*Primary Examiner*—David R Vincent
*Assistant Examiner*—Omar F Fernandez Rivas
(74) *Attorney, Agent, or Firm*—Adams & Wilks

(57) ABSTRACT

An active semiotic system creates implicit symbols and their alphabets from features, structural combination of features, objects and patters, creates models with explicit structures that are labeled with the implicit symbols, and derive other models in the same format via diagrammatic- and graph transformations. The active semiotic system treats vision as a part of a larger system that converts visual information into special knowledge structures that drive a vision process, resolve ambiguity and uncertainty via feedback projections, and provide image understanding that is an interpretation of visual information in terms of corresponding knowledge models. Mechanisms of image understanding, including mid- and high-level vision, are presented as methods and algorithms of the active semiotic system, where they are special kinds of diagrammatic and graph transformations. Derived structures, and not a primary view, are the subject for recognition, and such recognition is not affected by local changes and appearances of the object from a set of similar views, thereby allowing a robot or unmanned vehicle to interpret images and video similar to human beings for better situation awareness and intelligent tactical behavior in real world situations.

50 Claims, 13 Drawing Sheets

OTHER PUBLICATIONS

Rosenblum, Mark, "A High Fidelity Multi-Sensor Scene Understanding System . . . ", Intelligent Vehicles Symposium, pp. 637-643, 2000, U.S.A.

Balakirsky, Stephen, "Vehicle Level Model Manager Interface Description", U.S. Department of Commerce, pp. 1-28, 1999, U.S.A.

Matsakis, Pascal, et al., "Linguistic Description of Relative Positions in Images", IEEE Transactions on Systems, Man, and Cybergenetics, vol. 31, No. 4, 2001.

Schlenoff, Craig, et al., "Experiences in Developing an Intelligent Ground Vehicle . . . ", Proceedings of the 7th International Protege Conference, 2006, U.S.A.

Salembier, Philippe, et al., "Visual Segment Tree Creation for MPEG-7 Description Schemes", Pattern Recognition 35, pp. 563-579, 2001, France.

Liedtke, C. E., et al., "AIDA: A System for the Knowledge Based Interpretation of Remote Sensing Data", Third Airborne Remote Sensing Conference and Exhibition, 1997, Denmark.

Sagerer, G.,"Semantic Models..Object Recognition..", International Archives of Photogrammetry and Remote Sensing, vol. XXXI, Part B3, Commission 3, pp. 710-723, 1996 Germany.

\* cited by examiner

ACTIVE SEMIOTIC SYSTEM FOR IMAGE AND VIDEO UNDERSTANDING BY ROBOTS AND UNMANNED VEHICLES, METHODS AND APPARATUS

CROSS REFERENCE TO RELATED APPLICATIONS

This application claims the benefits of the provisional patent application 60/744,494, filed on Apr. 7, 2006, which is incorporated here by reference

FIELD OF THE INVENTION

The present invention relates generally to control systems of robots and unmanned vehicles and more specifically to their sensor systems when processing images from surrounding environment.

BACKGROUND OF THE INVENTION

To conserve soldiers' lives and provide Army units with operational and tactical advantages, The Department of Defense and The Army work on the development of Mobile Robots and Unmanned Ground Vehicles (UGV) under the Future Combat Systems (FCS) program. Tactical behaviors are essential in order to enable the UGV to perform in a battlefield environment. Most of these behaviors are identified in fighting manuals, standard operating procedures, etc.

A UGV is a member of a maneuvering unit, and it moves in an appropriate position at a particular distance and with a specific mission. Upon receiving information about friendly or enemy situations, tactical maneuvers may use folds in terrain and thick vegetation for cover and concealment, gaining and maintaining contact with an enemy entity without being detected, and occupying a position that provide an optimal line of sight for engaging the enemy. The UGV must be able to report enemy contact and chemical alerts, request orders and support fires. For an armed UGV, tactical behaviors include targeting, engaging, and assessing damage. Targeting includes finding, identifying, and handing off targets. Survivability includes changing battle positions, hiding, firing, and calling for additional support. If captured, a UGV might call in artillery on itself or self-destruct. The UGV must also protect itself from natural dangers and be able to estimate obstacles.

Tactical behaviors for robots have not fully matured yet. Most development efforts are focused on self-preservation. Much work has begun in the area of cognitive modeling, neural networks, Bayesian networks, case-based reasoning, and other decision-making methods. Advances in software for real-time cognitive processes are not being integrated yet into tactical behavior technologies for UGV systems.

Unstructured roads pose a challenge because the roads are likely to appear unmarked, and edges may not be distinct. Current approaches may lose the road on sharp curves or classify steep slopes as obstacles. Obstacle detection on unstructured roads may be more difficult because curves or dips may limit opportunity to look far ahead. Difficulty will be encountered when the "road" is defined more by texture and context. In a combat environment obstacles may include bomb craters, masonry piles, or other debris. On-road mobility in an urban environment is very difficult. In addition, perception performance will be affected by weather, levels of illumination, and natural and manmade obscurants that affect visibility.

There has been significant progress in road following, obstacle detection and avoidance, terrain classification, and traversability analysis for off-road mobility. But despite impressive demonstrations, today's automated systems remain below human driving performance under realistic driving conditions even on structured roads. And there are significant gaps in road-following capability and performance in the urban environment, on unstructured roads and under all-weather conditions.

The nature of combat situations requires FCS to be equipped with a target recognition system. For many years, the solution of target recognition problems was linked to the solution of more generic Pattern Recognition Problem. The successes of pattern recognition algorithms created a hope that they can be used for recognizing targets. But their performance always sharply degraded under field conditions.

Major points of failure of the target recognition system were its inability to separate a target from a clutter, to identify possible target location in a natural environment, and reliably recognize occluded targets. It became apparent soon that reliable target detection and identification go far beyond the scope of the Pattern Recognition Problem.

More importantly, the system was able to react only when something already started happening and target became clearly noticeable, which might not be acceptable for combat situations, especially for FCS. Target may pose a threat, and this threat should be identified and destroyed or avoided before it is too late. Because of that, human observers can monitor and scan potential threat areas and find hidden objects while the modern computer vision systems lack these capabilities.

The real problems of machine perception are not in the imprecision of sensors. In fact, sensors become more and more sophisticated and precise, and they can see far beyond the human senses. But nothing yet can replace human vision in its unique ability to understand and interpret perceptual information. None of the systems can match the performance of an alert human driver, which is using context and experience in addition to perception.

In the human vision, the scene context plays a significant role in the identification of an object.

In many cases such identification is only possible when using context: temporal and spatial relations between the parts of a scene and inferred facts, unobservable in the scene.

In many cases, an object can only be recognized correctly after identification of its role/position in the visual scene. Therefore, the separation of an object from clutter might simply not be feasible without this step.

However, the mainstream of figure-ground separation algorithms still treats image information as a 2-Dimensional array of pixels, and uses simple separation criteria with a bottom-up approach. This usually creates an ambiguity and imprecision, while the natural vision provides unambiguous separation of an object from its background.

It was found that vision and knowledge areas in the brain are linked with forward and back projections, and knowledge is heavily used for object detection and identification. Vision mechanisms can never be completely understood apart from the informational processes related to knowledge and intelligence. Failure of modern computer vision systems is, in a major sense, failure of their knowledge components.

The problem of discrimination of a target from clutter is different from the segmentation of 2-Dimensional array upon some threshold criteria. The unambiguous separation requires the integration of bottom-up fusion of multiple local and regional features with intelligent top-down processes that involve knowledge and context.

There were significant efforts in conversion image data into meaningful informational structures, and also on usage of context in processing of visual information. For instance, Geographic Information Systems (GIS) can effectively address problems with geographic and satellite imagery, because geographic knowledge has been well formalized in the form of maps, and maps can be represented well in computerized form.

In the field of multimedia, the MPEG-7 standard was a wide industry effort to address these problems for generic images, converting them into XML structures. MPEG-7 provides a set of image primitives called Descriptors. The MPEG-7 Description Scheme is the structure and semantics of the relationships between image components, which may be both Descriptors and Description Schemes. A MPEG-7 image description consists of a Description Scheme and a set of Descriptor Values.

MPEG-7 supports a range of abstraction levels, from low-level video features, such as are object's shape, size, texture, color, movement, and position, to high-level semantic information. However, the MPEG-7 standard reflects the present state of image/video processing, and it only provides a set of predefined descriptors and schemas. MPEG-7 Visual Descriptors evolve from low-level image processing, which is well understood and formalized. However, Description Schemas relate to mid- and high-level image processing, which has not yet been well formalized.

Neither automatic and semiautomatic feature extraction nor schema creating algorithms is inside the scope of the MPEG-7 standard. Although most low-level features can be extracted automatically, high-level features and schemas usually need human supervision and annotation. Only the description format in MPEG-7 is fixed and not the extraction and transformation methodologies. These are the areas that must be addressed.

The highest level of image description is the semantic one, and MPEG-7 standardizes information on these levels. But the problem of transforming primary image structures directly into semantic description has not been solved yet, as processes on the intermediary levels are not well understood and formalized.

Although RDF (Resource Description Framework) is better than other schemas in its ability to specify relationships and graphs, the MPEG-7 Group has made a decision to use an easily understandable and readable XML (Extensible Markup Language) Schema Language as the MPEG-7 DDL. However, neither RDF nor XML Schema has been designed to describe complex dynamic hierarchical structures that constitute most of real images.

MPEG-7 Visual Descriptors can be used for searching and filtering images and videos based on several visual features such as color, texture, object shape, object motion, and camera motion. This allows measuring the similarity between images and videos. Such a set of descriptors might be effective for the entire image.

There are other similar approaches toward converting images into their structured description that is based on image low level features and their combinations, which use either top-down or bottom-up flow of processing image data or both types of flow, and attaching linguistic values for semantic querying. The most of arts are trying to convert image into a sort of structural description that can be compared against a similarly described collection of images stored in a database.

These approaches might work well for image and multimedia databases as they allow for creating structured collections of images, and querying them on certain similarity criteria, but not for the robots and UGVs that must perform in the real-time and in hostile environments. These approaches not only add extra steps, but also increase reaction time which might be vital for the real-time systems. More importantly, they are not able to provide the needed level of understanding of the environment by a robot or an Unmanned Ground Vehicle.

Any real world environment has the dynamic nature, and so is visual information. Ambiguity and uncertainty in the real-world visual information can not be resolved without a system of active vision. There are many situations when generation of a meaningful structural description might not be possible for certain image components without interaction with motor programs.

In the brain, spatial perceptual information hierarchically converts from quantities to qualities, from qualities to objects, from objects to spatial situations. Temporal perceptual information converts from changes to actions, from actions and objects to events, from events to "cause and effect" links, and from them to algorithms and scenarios. Feedback projections exist in the brain on every level. They provide context and help to resolve ambiguity and uncertainty.

Such conversions are achieved with the help of mid-level vision. Phenomena of mid-level vision are known as perceptual grouping and organization. They can be partially described with so-called gestalt laws. However, these processes are neither well understood nor formalized. There is no common opinion on how these processes might be represented for computer simulation. As of today, there is a significant gap between low-level image processing and its semantic description.

To be useful in the battlefield component of the Armed Forces, military robots must exhibit predictive situation awareness. This requires a decision support context, and this is not possible without an effective knowledge system that provides effective World Modeling. This is the basis for planning in a generation of behaviors and the resolution of uncertainty in sensory processing. These ideas have been built into the RCS architecture. However, the success or failure of an implementation strongly depends on how effectively different subsystems can communicate with each other and on how effectively knowledge representation serves the goals of the subsystems.

The NIST 4D/RCS architecture provides analysis, design, and implementation methodology for development of real-time control systems using sensory information to guide the intelligent vehicle in the execution of complex tasks. A strong side of RCS architecture is a hierarchical framework for task execution planning and adaptation to changes in the environment.

The traditional approach to tactical-level reasoning is the rule-based systems, implemented either as monolithic decision-trees or finite state machines. Such approaches are inspired by defensive driving literature, where knowledge is often expressed in the form of high-level rules. Simple versions of such rules can be used as a starting point for a rule-based tactical driving system.

The development of intelligent ground vehicles requires a thorough understanding of intelligent behavior, which a UGV must exhibit. Knowledge representation techniques are needed to capture information that the sensor system perceives and organize that knowledge in a fashion that makes it easy to retrieve and process.

Knowledge models exist today in the forms of frames, expert and production systems, logical and functional programs, and DAML and OWL ontologies, etc. Knowledge is captured in the software development area in the form of objects and simulation models, including AI games. The latest wave of knowledge models is built upon the XML trees. Each of the current knowledge models can address certain problems, but not cover everything. J. F. Sowa called this situation "knowledge soup".

Knowledge systems have been intensively studied beginning in the late 1960s, but the status of knowledge models is very similar to Computer Vision, where numerous theoretical and computational methods exist but none of them can cover the entire process. In the same way, the established methods of knowledge representation capture certain aspects of knowledge processes and models, but none of them can meet the requirements to knowledge representation from the previous page in the first section.

Existing knowledge models are based on artificial theories that are based upon symbolic strings and constructs of a written language. Formal logic has been developed further into a separate branch of science as abstractions of these methods.

The artificial symbolic strings of a written human language cannot serve as a good representation for knowledge models. Written language is just a static reflection of knowledge models and processes, happening in the brain. To obtain a full-scale knowledge system, written language must be accompanied with a context system and with a processor—an inference engine. Although strings of symbols are perfectly readable by humans, it is difficult to build an inference engine for such a representation of knowledge. Such a knowledge system is limited mostly to what a human can type in.

It is well known that expert systems in the late 80's and early 90's have proved themselves to be ineffective in most areas of potential application. Even when it was possible to collect enough knowledge to cover a major number of possible cases of system behavior, there always were some unplanned situations. Because this type of system can handle only situations that have been anticipated and entered into the system via facts and rules, a human being must be involved in the system all the time in the event that an unplanned situation arrives. However, a human operator inside the loop jeopardizes the whole idea of such a system. This representation is good for knowledge acquisition, serving as a mediator between human experts and computers. But it does not serve well for modeling.

In other words, an appearance of knowledge models rather than their true modeling nature was the subject of studies in past. And this approach hid the true modeling capabilities of knowledge systems from researchers and developers.

String representations have no connection to neuroscience and brain research. Without an appropriate theory of knowledge, there was a strong tendency to substitute models of informational processes for models of physical processes in the neural "hardware". But such models don't appear to capture the essence of informational processes in biological systems. Physical processes are not identical to informational processes. A complex pattern of energy activity in the semiconductors of a microchip is described as a complex set of partial differential equations. But on the informational level it represents Boolean 0-s and 1-s. If differential equations were used instead of Boolean logic, digital computers would remain a highly theoretical idea. For our goals, instead of emulating physical processes in the cortex, it would be better to discover the informational representation of intelligent operations in the cortex.

The unsolved problems with knowledge and lack of its unified representation and processing leave the current arts at the level of separate methods which do not allow them for the creating of a full-scale perception system for robots and unmanned vehicles without meeting additional requirements.

If we look at the commonalities among all known knowledge models, we can find that knowledge has a hierarchical relational nature, and knowledge models can be expressed in the form of graphs and diagrams. The first systems of writing were based on pictorial representation rather than on symbolic strings and they look like pictorial diagrams that show the story in space and time. Diagrams inspired scientists and philosophers such as Charles Sanders Pears to create abstract logical systems. After recognizing the failure of expert systems, there was an intensive search of more natural ways of representing knowledge.

A string is a chain of symbols, whereas a chain is a flat and one-dimensional graph. A chain represents a linear sequence but not a relational model. Moving knowledge representation from strings into a multidimensional graph- or diagrammatic form aids in solving problems that string representation alone suffered from.

This situation begin changing in recent years with the development of multi-agent systems, methods of computational intelligence, and theories of visual languages, graph- and diagram-based representations and other natural representations of knowledge.

In the mainstream of modern software development, World Modeling is supposed to be achieved with a Multi-Agent System, which is connected to a Knowledge Base. An agent represents a model or a process that is supposed to solve certain tasks. The term "Multi-Agent systems" covers multiple sets of agents that are supposed to communicate with each other for solving more complex problems than a single agent can solve.

Today, such systems are built on empirical bases. There is still no widely accepted theory of how knowledge and intelligence can be represented in the brain and how such system works with vision, and what is required for the implementation of an effective knowledge system for perception, prediction, decision making, and control.

Any World Model can be described as a System. A System has an identifiable hierarchical relational structure. However, it is impossible to have a complete set of models for every possible situation. Knowledge is incomplete in this sense. Instead, it helps to build models on the fly from smaller, but verified models.

Knowledge Models include facts and rules. Facts are small fragmentary models of the World that are believed to be true. Rules are generalized fragmentary models, where concrete entities are replaced with classes or roles. When such models come together in an active space, they tend to create a larger model.

Therefore, Knowledge Representation should allow for synthesis, analysis and verification of models, and requires a processor that can handle these operations. These processes are logical. Synthesis is successful if analysis and verification cannot find any contradiction in the created model.

Processes in a robotic system are largely driven by input from the perceptual system, helping to choose the right models. However, perceptual system must speak a language that the knowledge system understands. In other words, perception should have the same representation of models and processes at a certain level that knowledge systems have.

There are relations between the model's components and processes. Other types of relations group entities and processes into sets and classes. These relations can be used for traversing knowledge bases in search of needed fragments and for creating analogies, which are special kinds of rules. Therefore, effective Knowledge Representation requires a context system and must be based on relations. Relations specify constraints in the system.

An important question is how to express components, processes and relations: implicitly or explicitly? From a design point of view this means: what should be hard-coded, and what can be represented with flexible replaceable models.

If we have an implicit representation of relations, they are hardcoded into the designed system. In this case, the system will have a predetermined structure, and can handle a predefined set of cases only. Therefore, in order to allow for changing the structure of the system on the fly, relations in such a system should be represented explicitly with a sort of a special class that represents a relation. A class that represents a model can have a flexible set of "relations" in its properties, and this will allow for changing the structure of the model dynamically.

On the other hand, if we code entities in our system explicitly, then we also have an inflexible model structure where every block is hard-coded. To avoid this, we need an implicit representation for entities via a class that reference such an entity, or points to it. In this case, the structure of the system can also be modified by changing a reference or re-pointing to another entity.

In such a statement of the problem, a system explicitly reveals its structure while using implicit symbolic names for its entities and components. It allows for the incorporation of structural transformations into the runtime system. This makes Knowledge Models dynamic and flexible, and permits their creation and modification dynamically.

There was a gap between the higher-level knowledge representation in the symbolic form and low-level quantitative image information. The mechanism of transfer of quantities into qualities and symbols was not clear for decades and became apparent only recently after many years of development of fuzzy set theory by L. Zadeh and others.

Lack of a unifying representation of knowledge has led to hybrid vision systems combining heuristics and dissimilar approaches. There are a few custom Image Understanding systems, and CAD-based, Model-based, Context-based, Object-based vision systems. They are based on the ideas of recognition as comparison of a primary view of an object with its 3-D model. Such "recognition" can work well only for non-occluded, non-cluttered objects that have their 3-D models in the system. Instead, the human vision gives us an understanding of the visual scene with ranges and distances.

Existing theories of perception give a very generic picture of possible information processing on the level of the entire brain, mapped to the particular cortical areas. Researchers have identified the major pathways of visual information in the brain that are related to different activities of the visual system. Instead of being a parallel process, vision appeared to be a multithreaded sequential process with two different but interconnected systems. Narrow foveal vision provides the separation of figure from ground, object identification, semantic analysis, and precise control of actions. Rough, wide peripheral vision identifies and tracks salient motion, guiding the foveal system to salient objects. It also provides the scene context.

Different phases of the vision process are known as low-, mid-, and high-level vision. Low-level vision is related to features and is very well studied. How the mid- and high-level vision works—has always been a mystery. Without methods that work with visual information as mid- and high level vision does it is not possible to create full-scale perception for robots and unmanned vehicles.

SUMMARY OF THE INVENTION

The goal of present invention is to address these problems and provide the methods and apparatus that allow for the creation of effective perception systems for robots and unmanned vehicles.

A subject of the present invention is an active knowledge system that:
Allows for the representation that unifies real-world perceptual and conceptual information on a single basis.
Allows for their processing on a single basis in real-time;
Can be a convenient basis for plans and models, and decision making process;
Can provide reliable description of contextual information;
Allows for easy search or derivation/inference of new models and their incorporation into the knowledge base.
Can be seamlessly embedded in the control systems of unmanned ground vehicles and robots, giving them ability to interpret visual information similar to human beings.

Also, this invention has thought to create the overall mechanisms of image understanding, including mid- and high-level vision with detailed description of the methods and algorithms of image/video understanding that can effectively work with the active knowledge system from the paragraph above.

Although the preferred embodiment targets military applications, it has to be understood that the invention can be applied to any other robotic, unmanned and automatic systems without departing from the spirit and scope of the present invention.

DETAILED DESCRIPTION OF INVENTION

Figure 1:
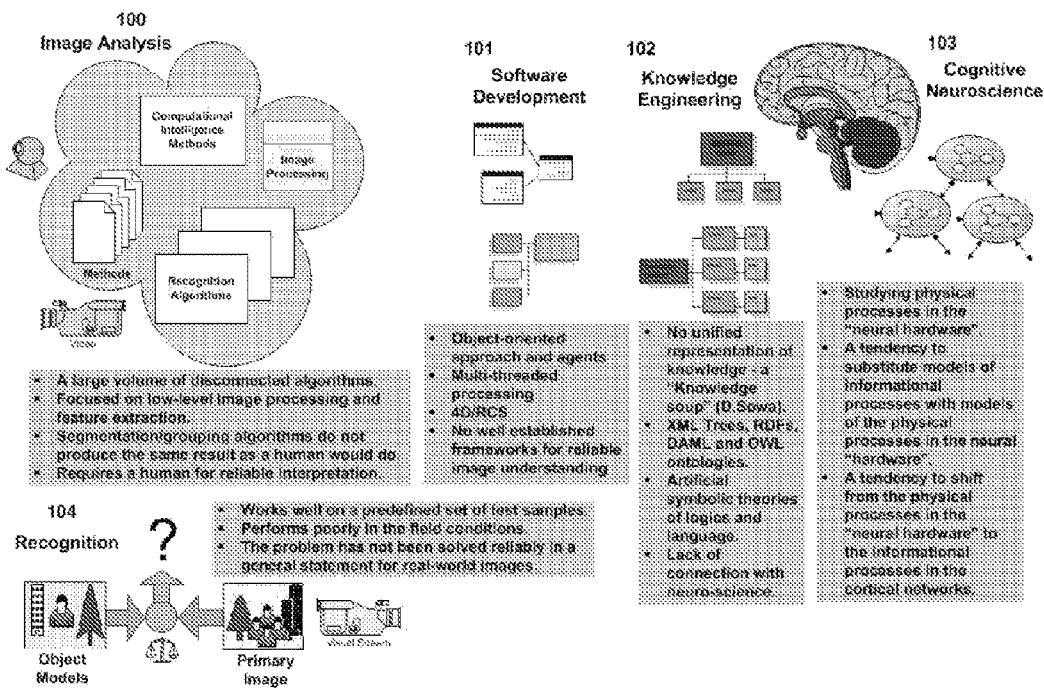
FIG. 1 is a diagram, illustrating the current state of prior art related to image and video understanding.

FIG. 1 is a diagram, illustrating the current state of prior art related to image and video understanding such as image analysis (100), software development (101), knowledge engineering (102) and cognitive neuroscience (103). At this time these areas are not connected to the degree that is needed to provide a reliable solution for the Image Understanding problem. Matching visual information against models of objects with modern methods of Pattern Recognition (104), does not produce satisfactory results and cannot be used in the real-time field systems.

Figure 2:
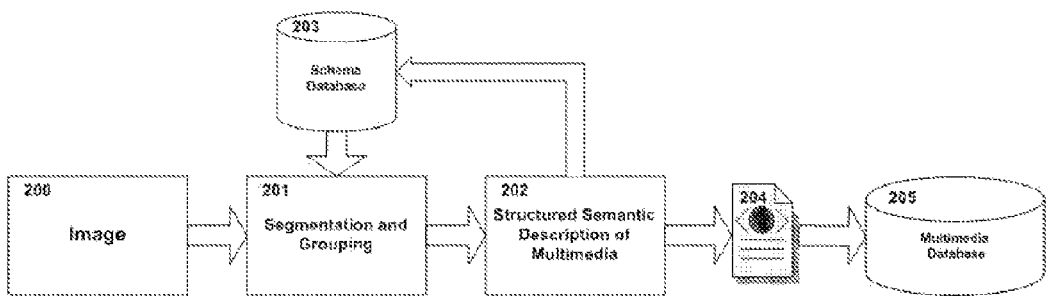
FIG. 2 is a diagram, illustrating prior art in the field of structured representation of images and multimedia.

FIG. 2 is a diagram, illustrating prior art in the field of structured representation of images and multimedia. Image information (200) is a subject of segmentation and grouping (201) for the converting into structured semantic description of multimedia (202), using pattern schemas that resides in the database (203). The result is usually written in XML (204), accordingly to MPEG-7 standard and can be saved in the database that contains collection of images (205).

These approaches might work well for image and multimedia databases as they allow for creating structured collections of images, and querying them on certain similarity criteria, but not for the robots and UGVs that must perform in the real-time and in hostile environments. These approaches not only add extra steps, increasing reaction time, that might be vital for the real-time systems. But, more importantly, they are not able to provide needed level of understanding of the environment by a robot or an Unmanned Ground Vehicle, as achieving this level require an autonomous active real-world knowledge system.

Also, any real world environment has the dynamic nature, and so is visual information. Ambiguity and uncertainty in the real-world visual information can not be resolved without a system of active vision. There are many situations when generation of a meaningful structural description might not be possible for certain image components without interaction with motor programs.

Figure 3:
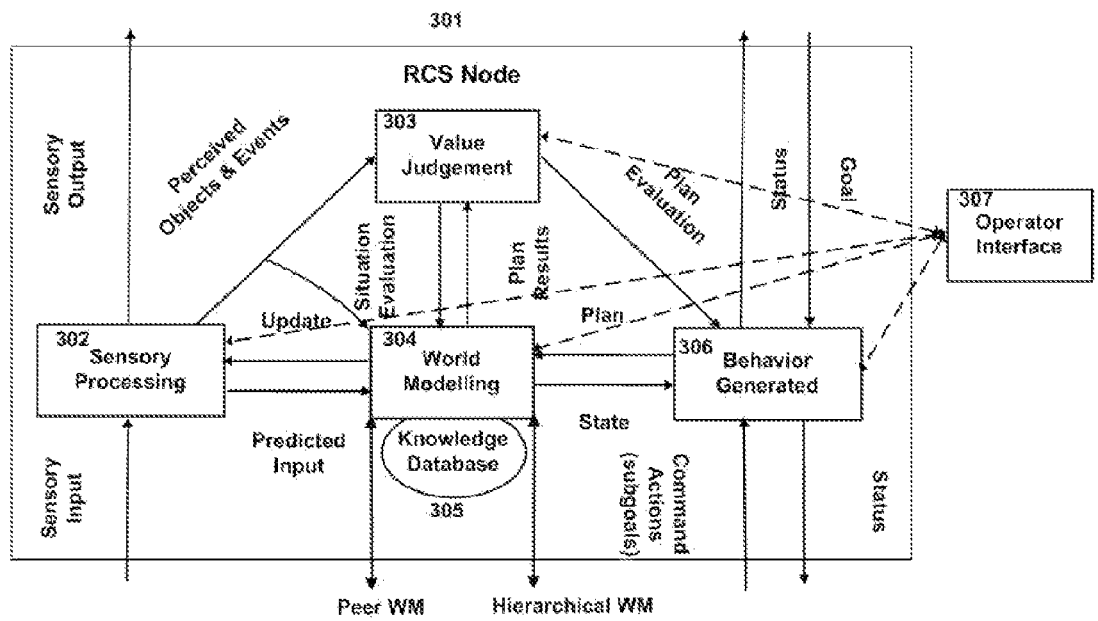
FIG. 3 is a diagram, shown an RCS node—NIST open architecture standard for intelligent control systems of robots and unmanned vehicles.

FIG. 3 is a diagram showing an RCS node (301)—NIST open architecture standard for intelligent control systems of robots and unmanned vehicles (adopted from NISTIR 69106). RCS is a set of high-level interfaces for a multi-layered hierarchy of computational agents each containing elements of sensory processing (302), world modeling (304), value judgment (303), behavior generation (306), and knowledge database (305). World Model supports simulation for planning and recursive estimation and predictive filtering for perception. Interaction between sensory processing and world model enables symbol grounding and provide semantic meaning to representations in the Knowledge Database. The effectiveness of the entire system and, therefore, the success of a practical implementation depend on how effective the knowledge representation in World Model and Knowledge Database can be.

Figure 4:
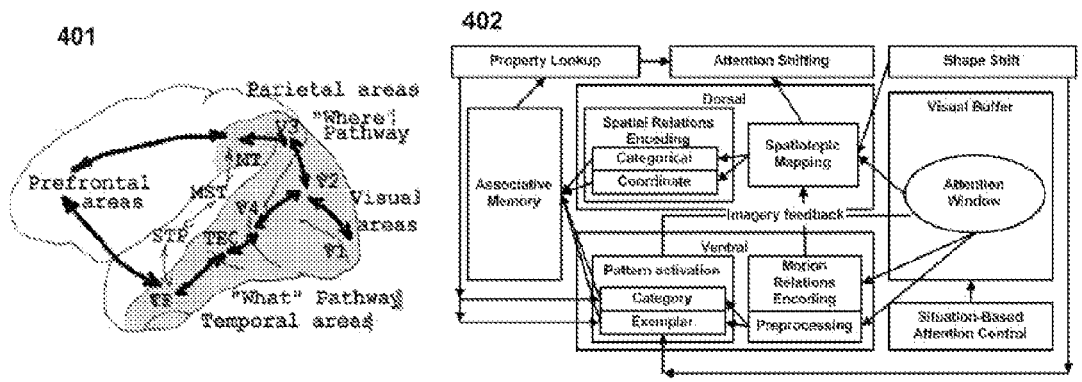
FIG. 4 is a diagram, illustrating prior art in the field of cognitive neuroscience—the generic schema of processing visual information in the human brain that also involve knowledge areas.

FIG. 4 is a diagram, illustrating prior art in the field of cognitive neuroscience. Major pathways of visual information in the brain that are related to different activities of the visual system have been identified (401) and generic schema of perception (402) (adopted from Kosslyn). The "where" (dorsal) pathway is a spatial-features encoding system, whereas the "what" (ventral) pathway is an object-features encoding subsystem. Outputs from both pathways come together in an "associative memory" in the prefrontal areas. Recognition occurs when an input matches a memory in the "what" system. Identification takes place when input image matches a stored representation in the associative memory.

Figure 5:
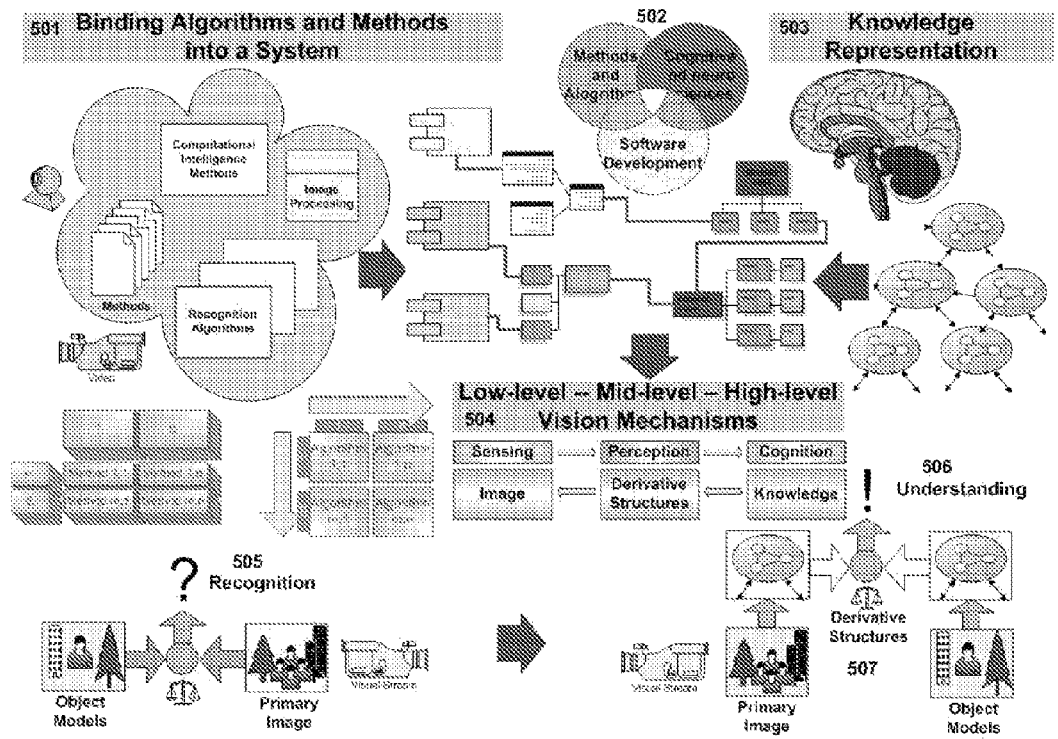
FIG. 5 is a diagram, illustrating what should be done for the solution of image understanding problems.

FIG. 5 is a diagram illustrating what should be done for the solution of image understanding problems. Unification of knowledge representation (503) and image analysis (502) on a single basis (501) allows for the implementation of low, mid, and high level vision processes in a single framework (504). Such a system matches derivative structures (507) that were produced by mid-level vision processes as graph transformations (506) rather than primary image views to the 3-dimensional object models (505), and heavily uses context obtained with high-level vision models for identification when the object is poorly seen or occluded. Methods of low-level vision that were accumulated in large numbers in the area of image analysis can be re-used via a set of standard interfaces.

Figure 6:
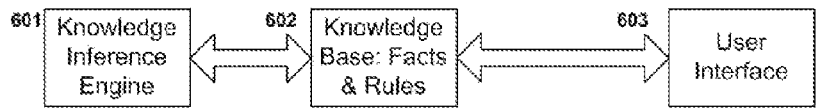
FIG. 6 is a diagram, illustrating the differences between the prior art in the area of knowledge representation—expert systems and ontologies and full-scale real time knowledge system proposed in the current invention.
Figure 6:
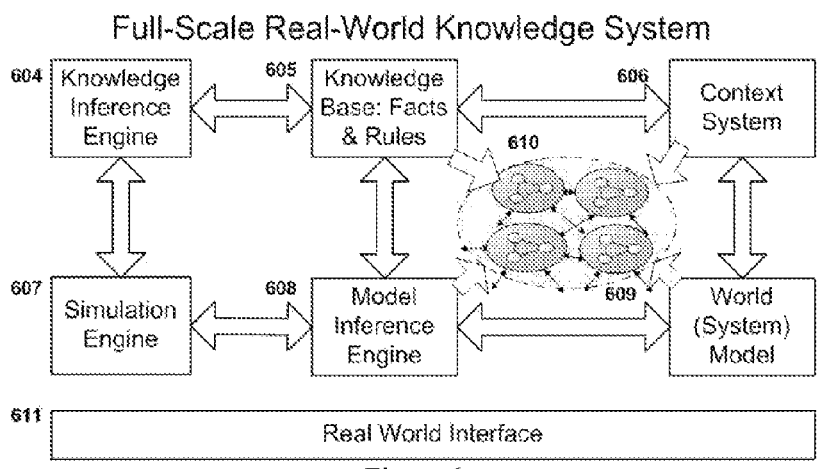

FIG. 6 is a diagram, illustrating the differences between the prior art in the area of knowledge representation—expert systems and ontologies and full-scale real time knowledge system.

Expert system or ontology consists of knowledge inference engine (601), knowledge base in form of facts and rules (602), expressed in constructions of written language such as symbolic strings, and user interface (603), that allows for querying knowledge base.

It is well known that expert systems in the late 80's and early 90's have proved themselves to be ineffective in most areas of potential application. Even when it was possible to collect enough knowledge to cover a major number of possible cases of system behavior, there always were some unplanned situations. Because such system can handle only situations that have been anticipated and entered into the system via facts and rules, a human being must be involved in the system all the time in the event that an unplanned situation arrives. However, a human operator inside the loop jeopardizes the whole idea of such a system. This representation is good for knowledge acquisition, serving as a mediator between human experts and computers, but it does not serve well for modeling.

A full-scale knowledge system that can function in real world conditions must also include besides knowledge inference engine (604) and a knowledge base (605), a context system (606), simulation engine (607), model inference engine (608), world (system) model (609) that preserves relations between world entities and processes (610), and real-world interface (611).

Figure 7:
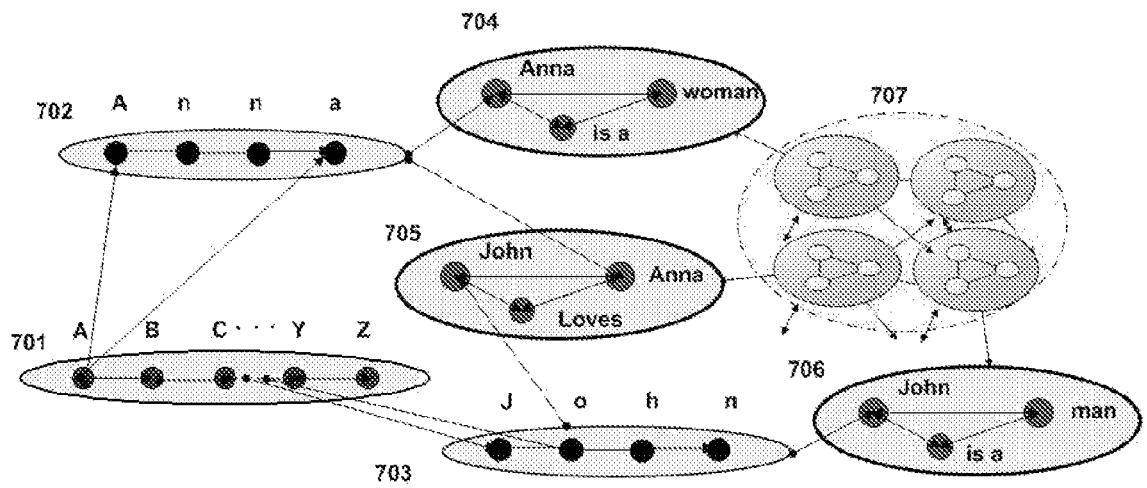
FIG. 7 is a diagram, illustrating prior art in the area of knowledge representation—diagrammatic representation of examples of written human language with explicit symbols and semantic labeling.

FIG. 7 is a diagram, illustrating prior art in the area of knowledge representation—diagrammatic representation of examples of written human language with explicit symbols and semantic labeling. The explicit alphabet (701), words (702, 703), sentences (704,705,706) are shown as diagrams. All of them are organized into language—a system of knowledge description (707). Existing knowledge models are based on artificial theories that are based upon symbolic strings and constructs of a written language. Formal logic has been developed further into a separate branch of science as abstractions of these methods.

The artificial symbolic strings of a written human language cannot serve as a good representation for knowledge models. Written language is just a static reflection of knowledge models and processes, happening in the brain.

Although strings of symbols are perfectly readable by humans, it is difficult to build an inference engine for such a representation of knowledge. Such a knowledge system is limited mostly to what a human can type in.

Figure 8:
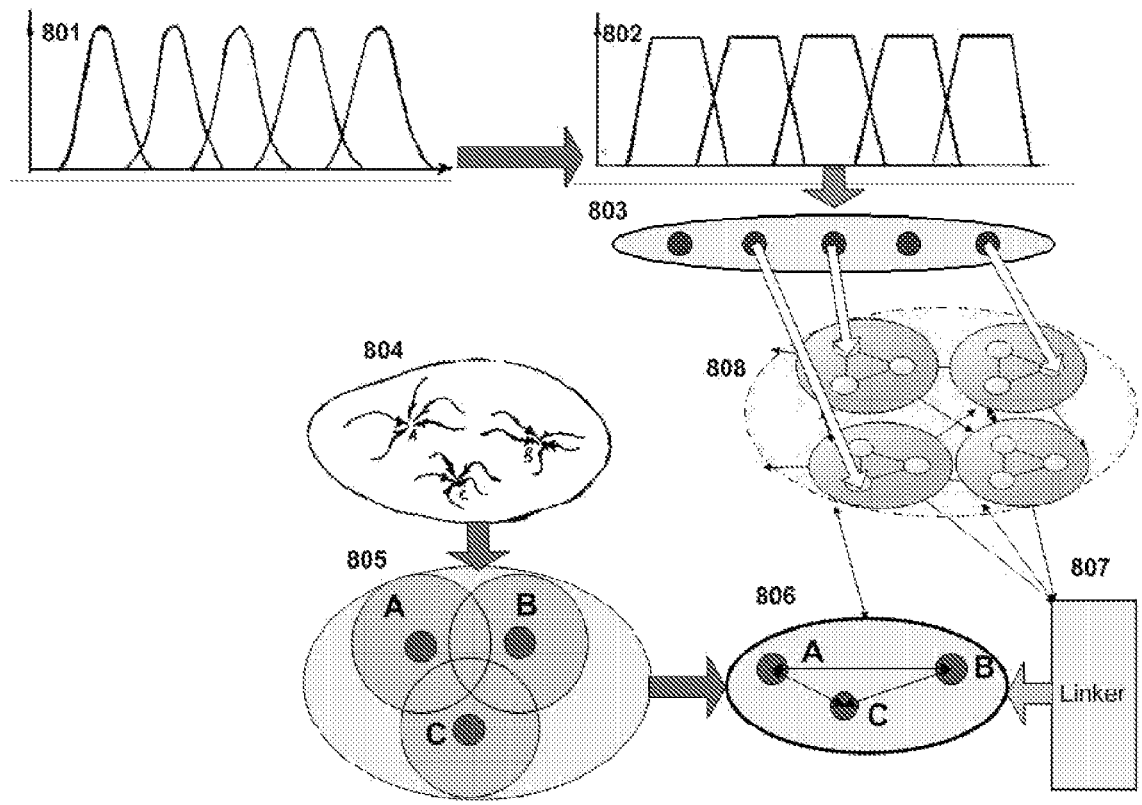
FIG. 8 is a diagram, illustrating methods of emerging implicit symbols and their alphabets in the brain that also can be achieved with methods of computational intelligence.

FIG. 8 is a diagram, illustrating methods of emerging implicit symbols and their alphabets in the brain that also can be achieved with methods of computational intelligence. There are no explicit symbols in the brain, but intelligent processes have symbolic nature.

Informational representations of a resonance are bell-shape functions (801). Introduction of Certainty Dimension or normalization converts such a function into a fuzzy set (802). The core of such fuzzy set is 100% certain, and can be represented as a member of a set (803) that contains linguistic values from the domain of the fuzzy variable that covers quantized axis.

However, these values do not have to be express linguistically. They can be defined as unique members of the set, and obtain their linguistic meaning within the set of relations to other concepts in the knowledge network (808)

Dynamics in neural network can be represented as an energy landscape with local minima as attractors (804). A threshold operation can convert the attractors into fuzzy sets (805), preserving their diagrammatic relationships (806). In the same way as in two paragraphs above, they can be represented as implicit symbols in certainty dimension. The topological relations between implicit symbols emulate a lattice-type structure.

Methods of Computational intelligence that can create such implicit symbols include, but are not limited with Fuzzy sets, supervised and unsupervised Neural Networks, etc.

With such a statement of the problem, an implicit symbol is a solution to a local pattern recognition problem with a finite number of possible patterns. The possible patterns form an implicit alphabet, which can be represented with a set or a lattice.

In this sense, an implicit symbol can stand for a concept, object, feature, pattern, and a node in the relational knowledge system. Linker mechanism (807) is necessary to include such symbols into set of relationships in order to obtain meaningful values.

Figure 9:
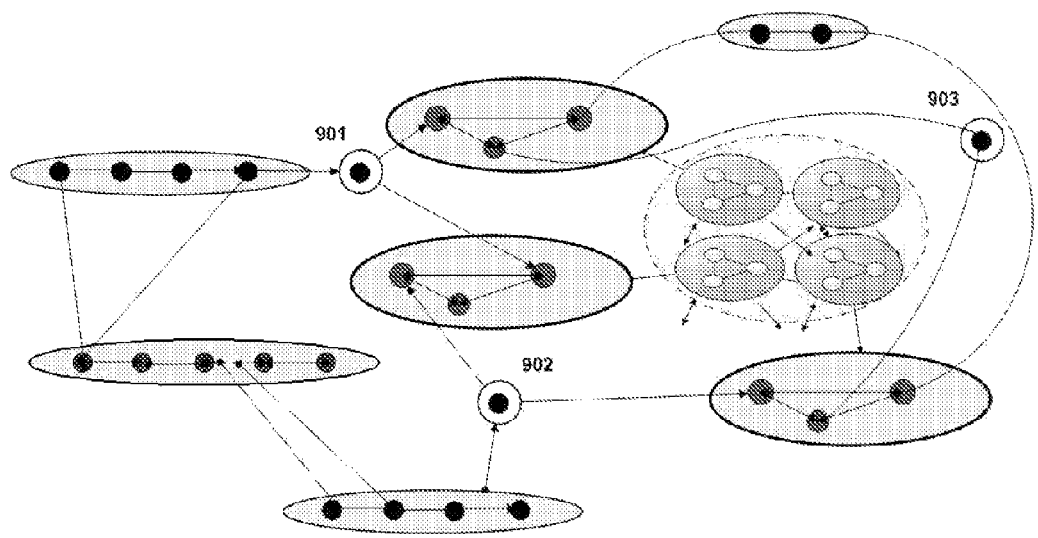
FIG. 9 is a diagram, illustrating implicit symbolic labeling with the same language diagrams as on FIG. 7.

FIG. 9 is a diagram, illustrating implicit symbolic labeling with the same language diagrams as on FIG. 7. In this case, linguistic values of nodes of the diagram are replaced with implicit symbols. However, new implicit symbols (901, 902, 903) must now stand for the objects and concepts that were previously shown by linguistic diagrams. And these symbols obtain their meaning from the system of relations.

Figure 10:
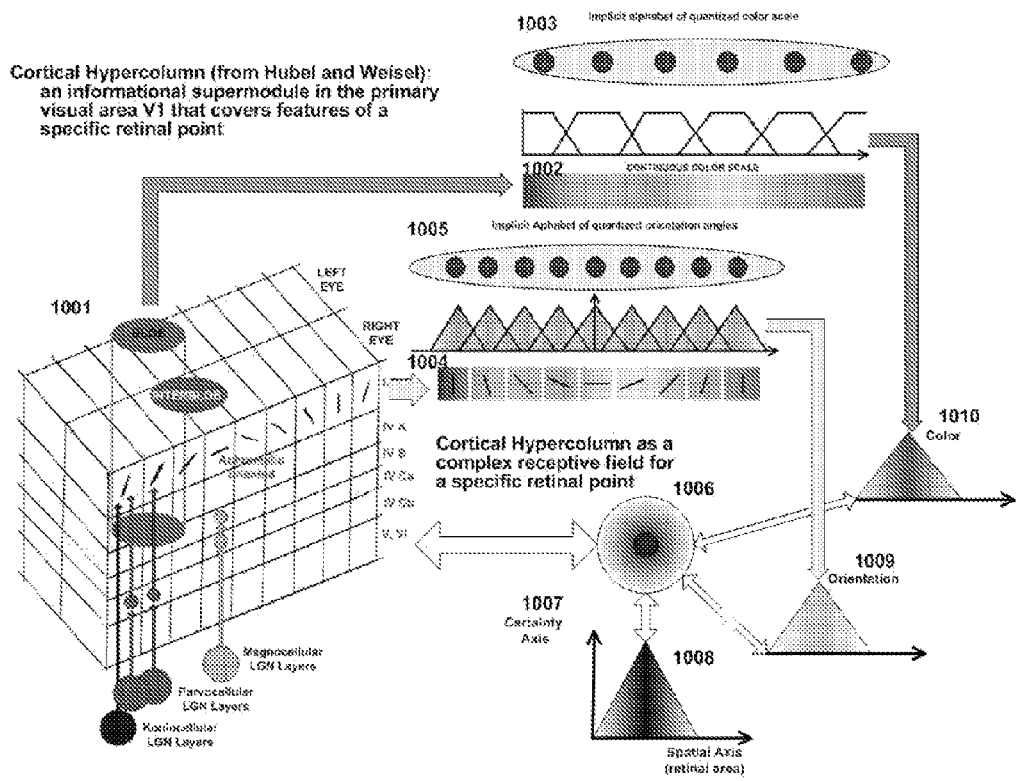
FIG. 10 is a diagram, illustrating cortical supercolumn—an informational module in the cortex that cover visual properties of a small visual area and can be represented as a set of implicit alphabets of visual properties or an advanced receptive field.

FIG. 10 is a diagram, illustrating cortical supercolumn (1001)—an informational module in the cortex that cover visual properties of a small visual area and can be represented as a set of implicit alphabets of visual properties or an advanced receptive field. A hypercolumn consists of alternating columns for each eye. The orientation sensitivity of the columns covers all possible angles within a retinal area. There are blobs—neural clusters that are responsible for the processing of color information, which are discontinuities within hypercolumns. A hypercolumn can be represented with a set of implicit alphabets that cover color (1002, 1003), possible orientation (1004, 1005), and disparity (not shown) that are bounded to a specific retinal point or a small local area. In this sense, a hypercolumn can be considered a complex receptive field (1006), that is capable of working with multiple "alphabets" of implicit symbols of orientation (1009), color (1010), disparity, etc. that can be derived in a particular point or a small local neighborhood area (1008) of an image with degree of certainty that reduces from 1 to 0 from center to borders (1007) and can be approximated with a fuzzy set.

Figure 11:
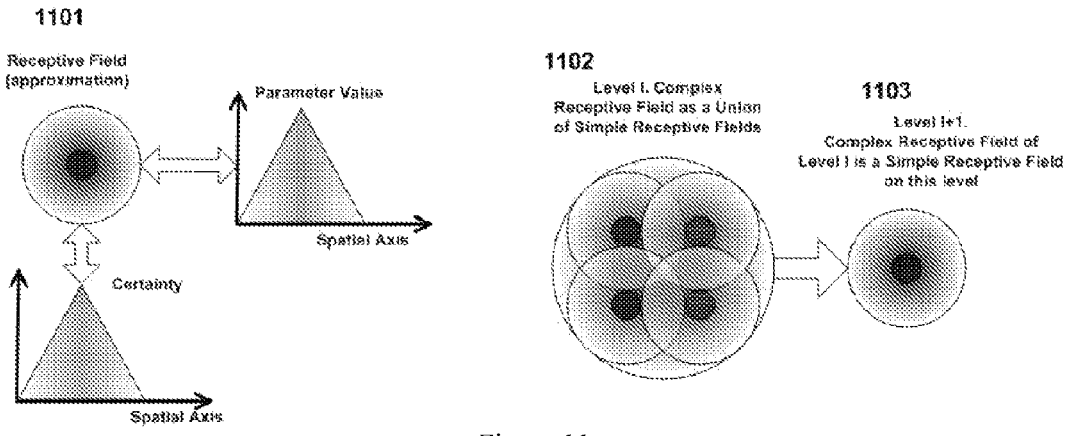
FIG. 11 is a diagram, illustrating multilevel hierarchical receptive fields.

FIG. 11 is a diagram, illustrating multilevel hierarchical receptive fields. The concept of a receptive field (1101) can be spatially represented as a fuzzy set. A "complex" receptive field (1102) spatially clusters receptive fields from a lower level, thus providing a hierarchy of information processing in a larger spatial area of an image. However, on its own level, it looks a simple receptive field (1003). This repeated multilevel hierarchical structure allows for multi-level hierarchical spatial clustering and space partitioning upon certain criteria, such as derived values of feature-symbols on a particular level. The clustering has a spatial nature, and there are no restrictions on types or numbers of processing features that are receptive field outputs.

Figure 12:
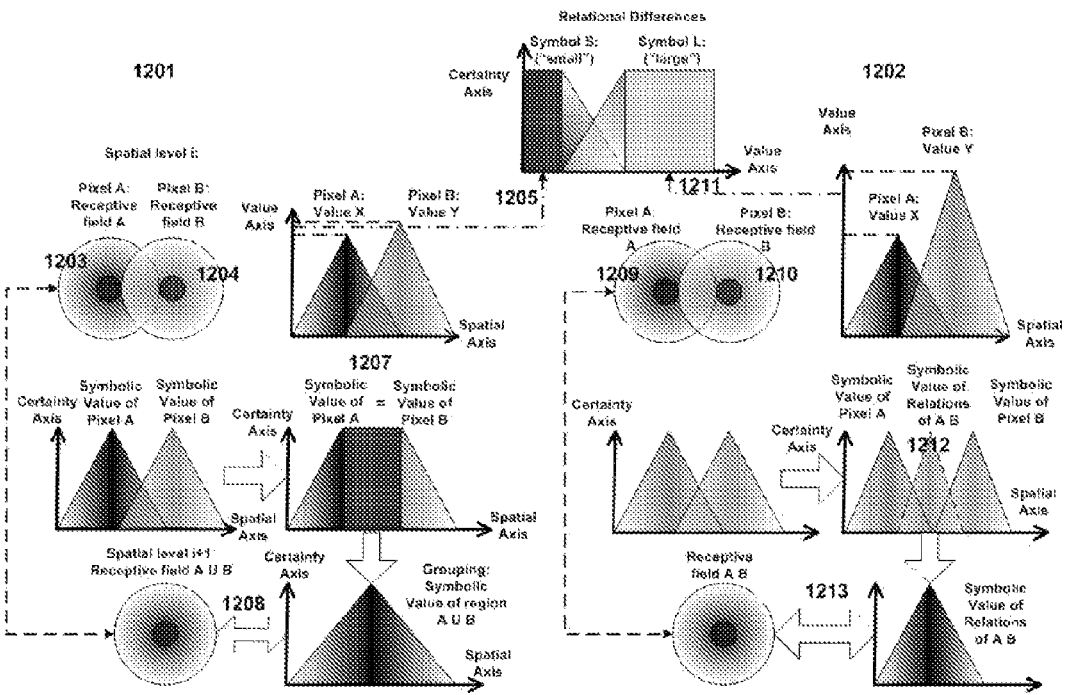
FIG. 12 is a diagram, showing how grouping and splitting of visual information can be achieved on symbolic level using mechanisms of computational intelligence

FIG. 12 is a diagram, showing how grouping (1201) and splitting (1202) of visual information can be achieved on symbolic level using mechanisms of computational intelligence. Logical Filtering is a combination of qualitative and quantitative methods. If a relational difference (1205) between the values X and Y of a certain feature of receptive fields (1203) and (1204) is "small", the fields can be considered similar. This allows for concatenating or clustering (1207) the receptive fields. A receptive field of a higher spatial level represents the union A U B, as it covers an area with similar features (1208). Such a clustering or integration upon the criteria of similarity can hierarchically cover a region of an image. If a relational difference is large (1211), there is no way to concatenate the two fields (1209, 1210). There is a relation between the values or symbols of the two fields and it can be represented with a certain symbol other then "=". A receptive field (1213) of a higher spatial level marked with such a symbol can represent a boundary (1212) between the two regions. Since a receptive field is a spatial structure that can carry different sets of symbols/features, it is possible to choose the basis for clustering and separation upon a single or multiple features.

Figure 13:
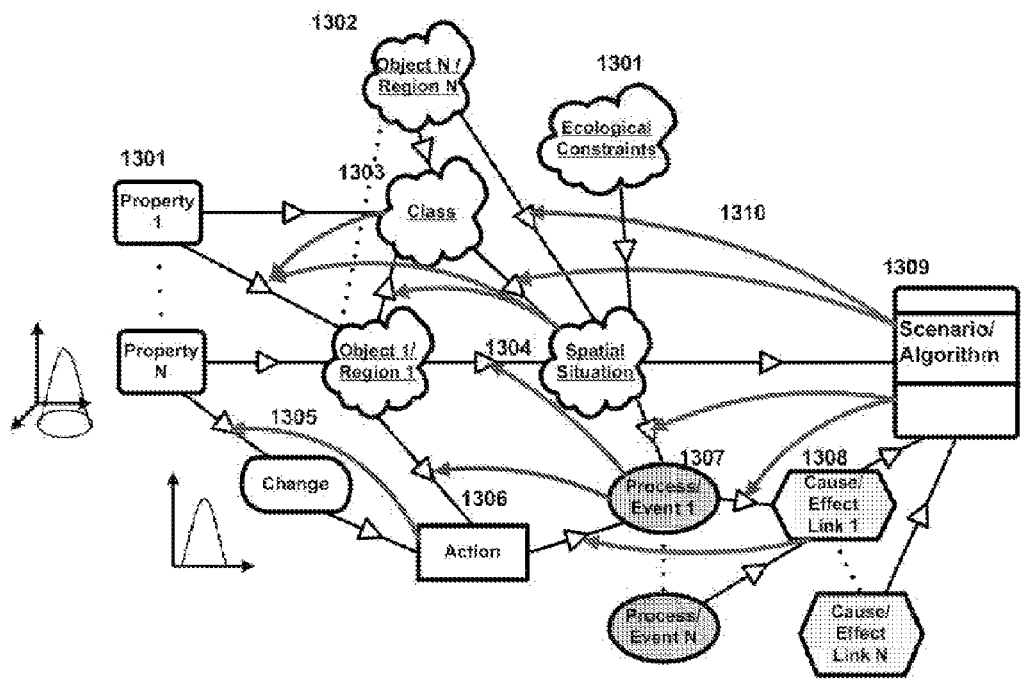
FIG. 13 is a diagram, illustrating hierarchy of processing visual information from primitives to semantic levels.

FIG. 13 is a diagram, illustrating hierarchy of processing visual information from primitives to semantic levels. In the brain, spatial perceptual information hierarchically converts from quantities to properties (1301), from qualities to objects or regions (1302), from objects to classes (1303) and to spatial situations (1304). Temporal perceptual information converts from changes (1305) to actions (1306), from actions and objects to events (1307), from events to cause & effect links (1308), and from cause & effect links to algorithms and scenarios (1309). There are also feedback projections (1310) that resolve ambiguity and uncertainty. Ecological constraints (1311) influence spatial situations.

Figure 14:
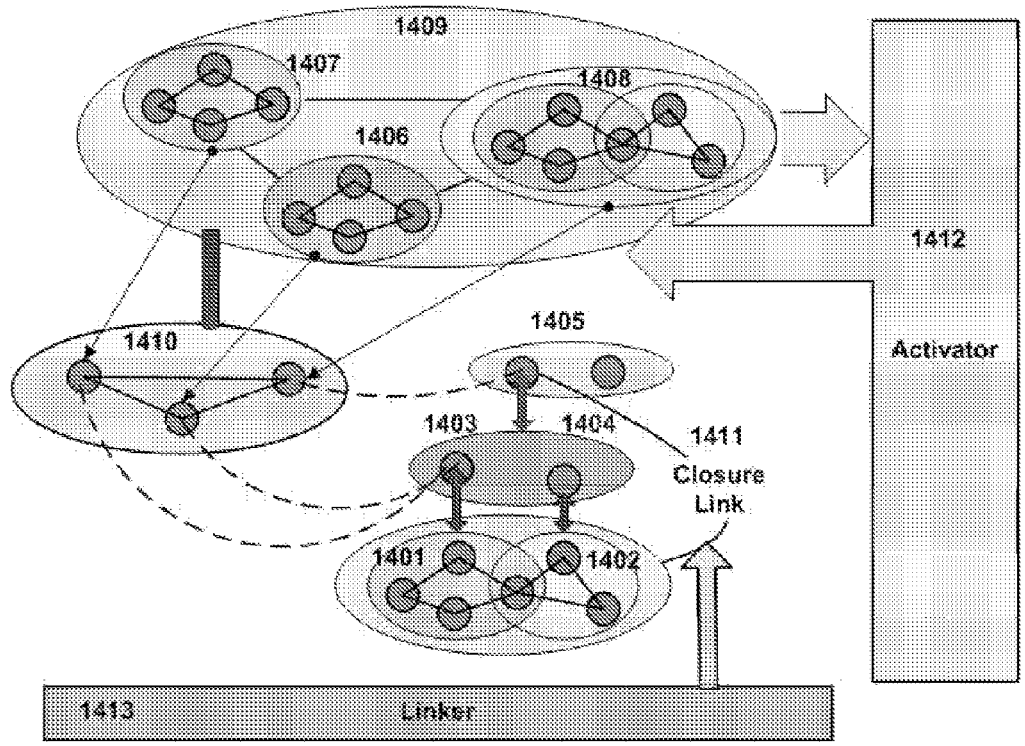
FIG. 14 is a diagram, illustrating diagrammatic inference with active diagrams and implicit symbols; methods of creation implicit symbols from the fragments of diagrams; closures that are equivalent to mathematical conclusions, but, within the proposed solution, are simply reflex-type links between initial and final symbols.

FIG. 14 is a diagram, illustrating diagrammatic inference with active diagrams and implicit symbols. Created implicit symbols (1403, 1404) can stand for the fragments of diagrams (1401, 1402). Their alphabet or lattice can have its own symbol (1405) created in other alphabet. When processing a new active diagram (1409), fragments (1407) and (1406) will be replaced with their symbol (1403) while fragment (1408) will be replaced with its symbol (1405). New compressed diagram (1410) may now be used in place of (1409). Closures (1411) are equivalent to mathematical conclusions as they allow for bypassing intermediary nodes and diagrams. But, within the present invention, they are simply reflex-type links between initial and final symbols. They can be created with a linker (1413) and activator (1412) within the active diagram system.

Figure 15:
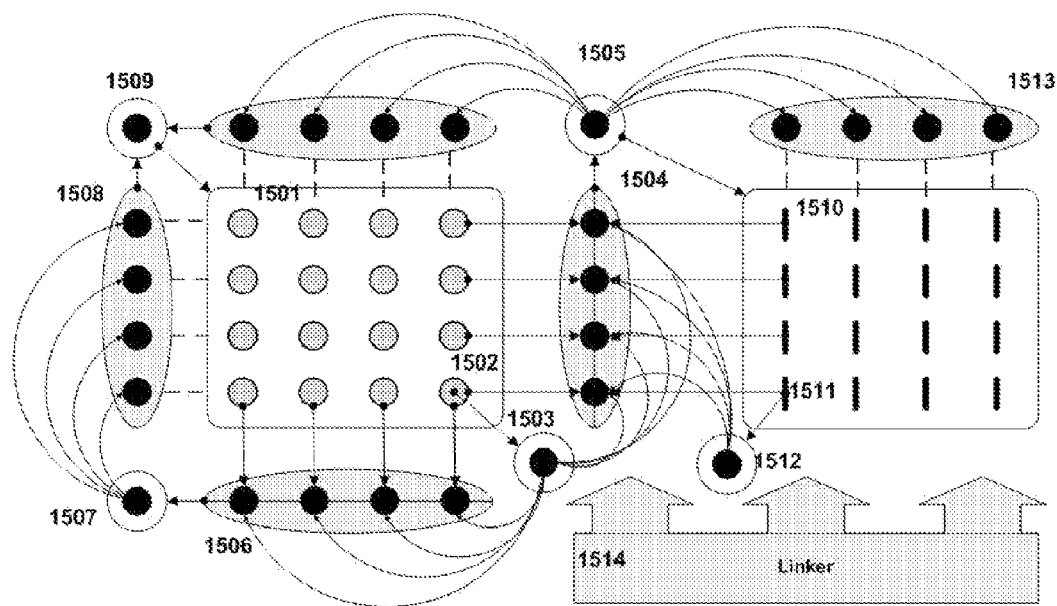
FIG. 15 is a diagram, illustrating analysis, or understanding, of gestalts with the set of active diagrams and implicit symbols.

FIG. 15 is a diagram illustrating an analysis or understanding of gestalts with the set of active diagrams and implicit symbols. Gestalt with circles (1501) is analyzed with the set of active diagrams. A symbol (1503) denotes circle (1502), the diagrams (1504, 1506) denote column and row respectively, and they are denoted with the symbols (1505) and (1506) respectively. These symbols create diagrams like (1508) that denote combination of rows and columns, and matrix (1509). When another gestalt (1510), or an image with similar structural properties, is processed in the system, it may re-use already created system of implicit symbols and diagrams that self-describe structural properties of the patterns. An example, where instead of group of circles (1501) there is a group (1510) of vertical lines (1511), that creates their own symbols (1512, 1513), but shares with the group (1501) a common part (1504, 1505), which has been created on a previous step when processing (1501), is shown in the right part of the figure. Linker (1514) helps to create these structures.

Figure 16:
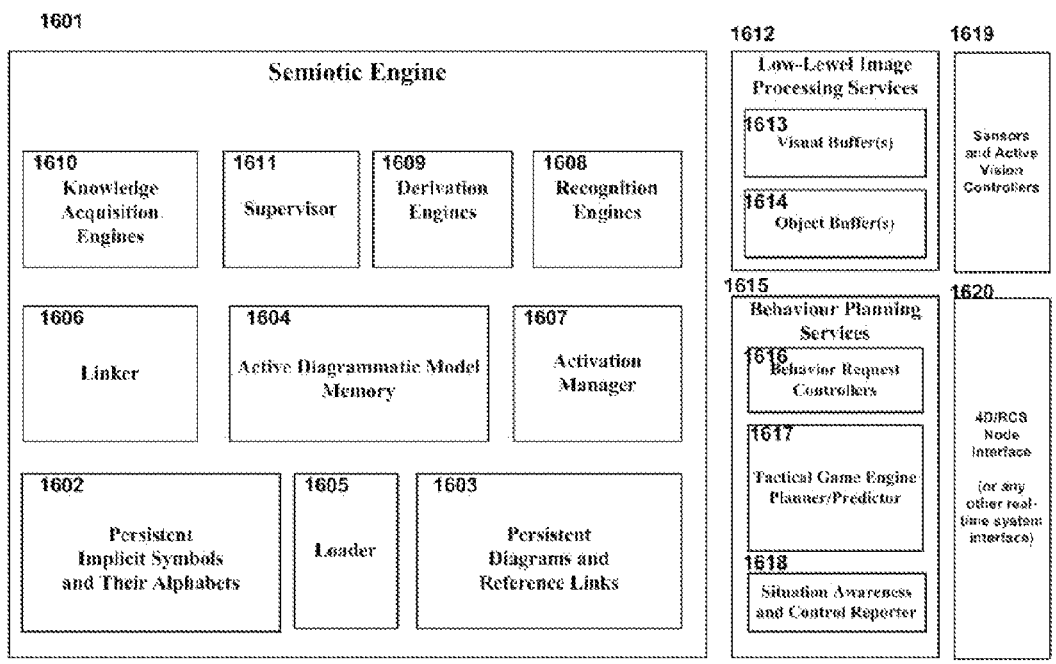
FIG. 16 is a diagram, showing basic components of presented invention.

FIG. 16 is a diagram showing basic components of the presented invention. It contains a semiotic engine (1601), which has knowledge repositories in the forms of persistent implicit symbols and their alphabets (1602) and persistent diagrams and reference links (1603), which can be loaded into active diagrammatic model memory (1604) with help of loader (1605) where they represent active relevant information. Linker (1606) helps to create new diagrammatic models and reference links, while activation manager (1607) controls relevancy of models in the active memory (1604). Derivation engines (1609) transform diagrammatic models, using graph and diagrammatic transformations. Recognition engines (1608) use methods of computational intelligence that allows for recognition or creation of new implicit symbols. Knowledge acquisition engines (1610) convert information from other formats into internal representation. Supervisor (1611) coordinates different processes. The engine works as a full scale real-world knowledge system and can process both perceptual and conceptual information in a unified basis. Low level image processing services subsystem (1612) includes a plurality of visual (1613) and object buffers (1614) that serve for the conversion of visual information into semiotic form that can be processed by the semiotic engine.

Behavior planning services or subsystem (1615) includes Situation Awareness and Control Reporter (1618) that communicates with other systems of UGV or the entire formation. Behavior request controllers (1616) communicate with motion control system, requesting actions or navigation. Sensors and active vision controllers (1619) obtain visual information corresponding to a visual scene in real world situations.

Tactical game engine (1617) works with semiotic engine in order to predict/plan a necessary course of action. System in the present embodiment will have interfaces to other control systems of UGV or robot.

This architecture and particular subsystems and components allow for their implementation both in the form of software system and as specialized hardware.

Figure 17:
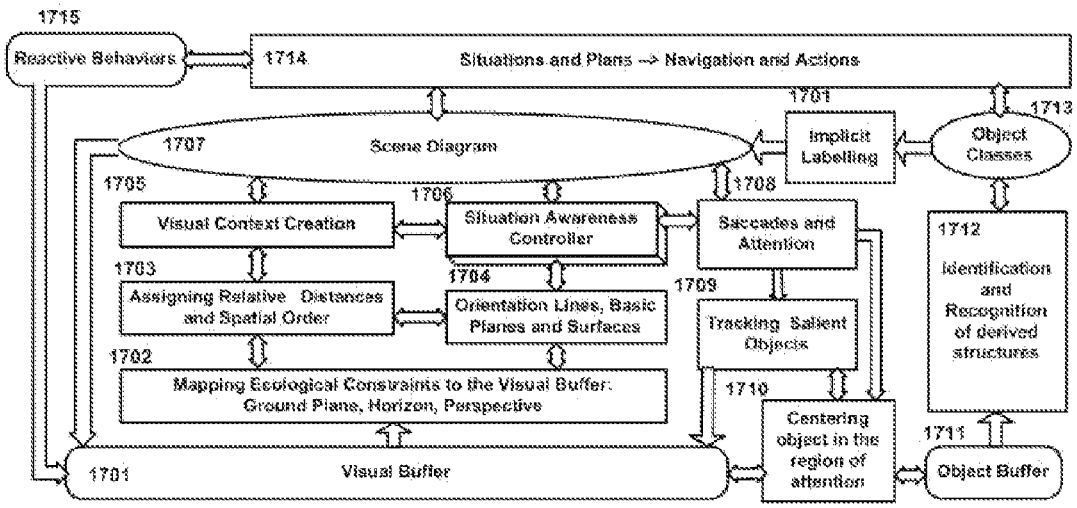
FIG. 17 is a diagram, describing method of processing visual information in the visual buffer of the invention.

FIG. 17 is a diagram describing a method of processing visual information in the visual buffer (1701) of the invention. The process starts from mapping ecological constraints into the visual buffer (1702), such as ground plane and horizon, assigning relative distances and spatial order (1703), finding orientation lines, basic image planes and surfaces (1704), and creating visual context (1705) that allows for the creation of a scene diagram (1707), which is an abstracted representation of the visual buffer. Situation awareness controller (1706) is an intelligent agent process in the system that controls all these processes, allowing for derivation of the scene diagram from the visual buffer. The processes are not linear as there are feedbacks that allows for synthesis of active diagrammatic models in the same way like the solution of a puzzle, where empty slots are filled upon context. The situation awareness controller also controls switching region of attention (1708) and tracking salient objects (1709). The region of attention is centered (1710) with respect to the possible center of the object and is placed into object buffer (1711), where the object is processed (1712). Recognized object classes (1713) create their symbols on the scene diagram. The scene diagram is mapped to the visual buffer, providing understanding of its content. The visual buffer is linked to reactive behaviors (1715) for tracking objects and the scene diagram is linked to other situation diagrams (1714).

Figure 18:
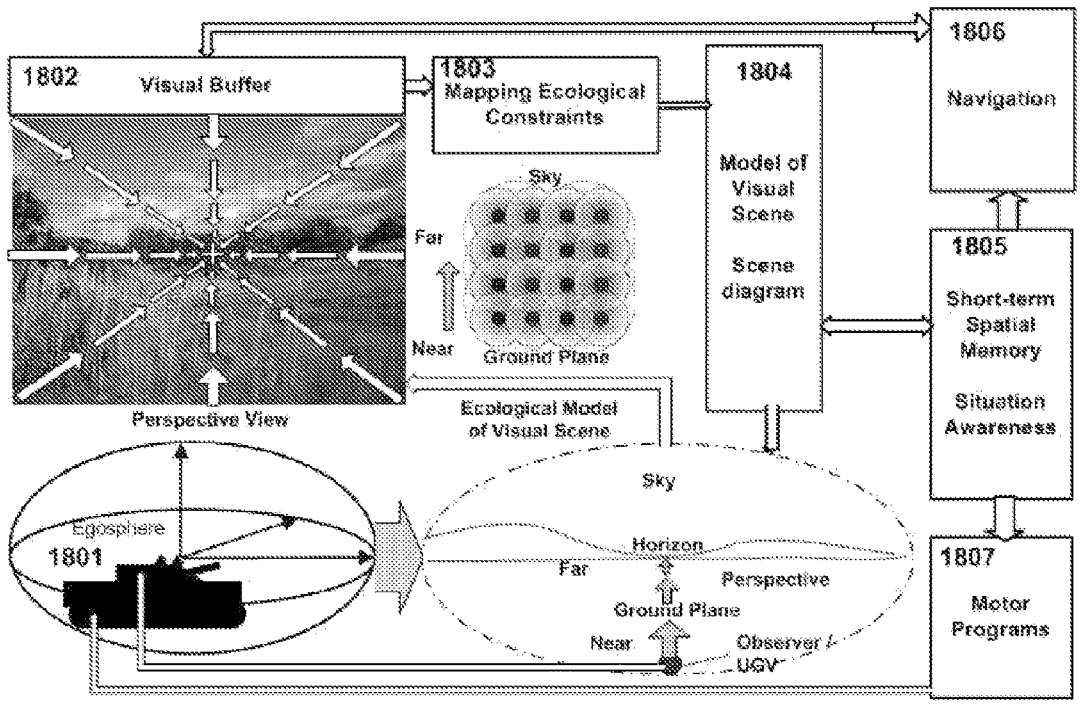
FIG. 18 is a diagram, visually illustrating processing of visual buffer with ecological constraints.

FIG. 18 is a diagram, visually illustrating processing of visual buffer with ecological constraints. The Ecological Model is a set of ecological constraints that allows for interpreting the content of the visual buffer (1802) as a visual description of 3-dimensional world. According to Gibson, the visual system of vertebrates has developed to effectively process visual information from the surrounding world. The world has certain basic properties, such as the Ground Plane, where the observer (1801) stands. The nearest to observer part of the Ground Plane is always under the observer's legs (in case of mobile robot or UGV-wheels), and is in the lowest part of the visual image. Therefore, the lowest part of an image can be considered as a ground plane, which spreads from the observer up to the horizon line where it meets with sky. The part of the ground plane closest to horizon, is also farthest from the observer. Object sizes on the ground plane reduce with distances from the observer's location. Such transformations are called perspective and can be visualized with a convergent bundle of lines shown as white arrows on image. Lines can be represented by chains of elements such as receptive fields in a discrete environment like the visual buffer with receptive fields. Ecological model of visual scene (1804) is a diagrammatic structure that allows for interpretation of the visual buffer in terms of ecological optics and for the assignment of relative distances and proportions. The interpretation process (1803) maps these constraints to the receptive fields of visual buffer that allows for them to be interpreted as a part of visual scene. Scene diagram resides in the short term spatial memory and is a part of situation awareness system (1805). This system can drive motion programs (1807) and navigate (1806), using changes of visual buffer, while these changes are "understood" with scene diagram.

Figure 19:
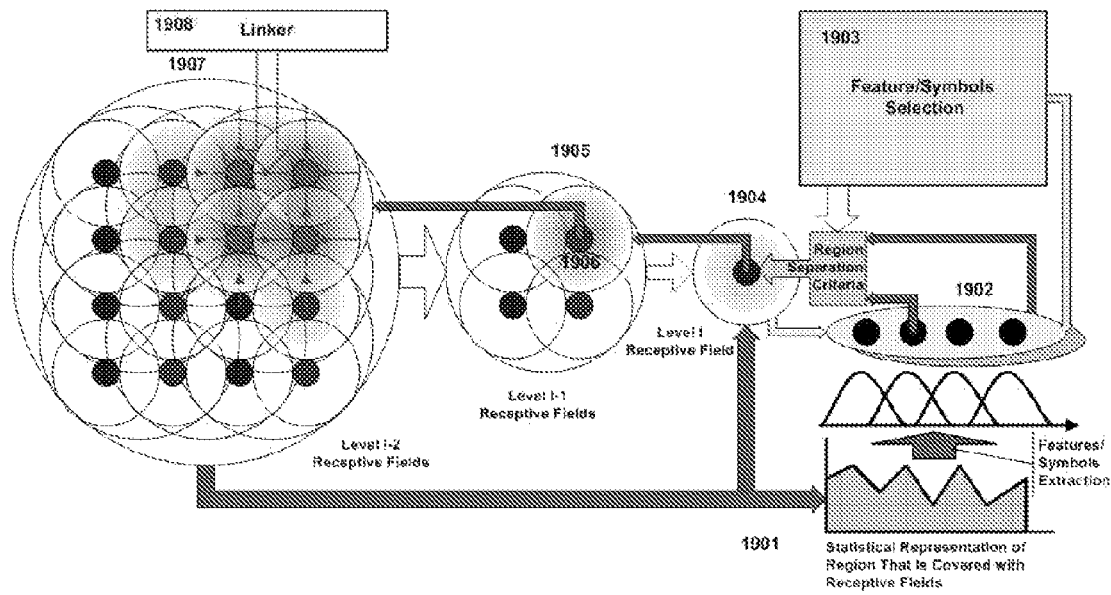
FIG. 19 is a diagram, illustrating method of processing rigid bodies in visual buffer.

FIG. 19 is a diagram, illustrating method of processing rigid bodies in visual buffer. Hierarchical fuzzy Top-Down process (1901,1902,1903) of separation of Receptive Fields on different levels (1904,1905,1907) that have selected features/symbols from the ones that have no such features/symbols leads to the creation of fine coherent structures of the regions with selected features/symbols on the lower levels.

Linker (1908) binds neighbor cells with similar features into coherent relational structures, and on multiple levels such a structure represents a tree, which hierarchically describes a form of a rigid body The level of grey in a receptive field shows a degree of presence in the area covered with the receptive field (1906) of a particular feature/symbol that is specified by the selection criteria. Arrows between the grayed receptive fields denote coherency relations between spatial elements of the selected region. The system of such coherent relations can help in the identification of the form of rigid bodies and other patterns.

Figure 20:
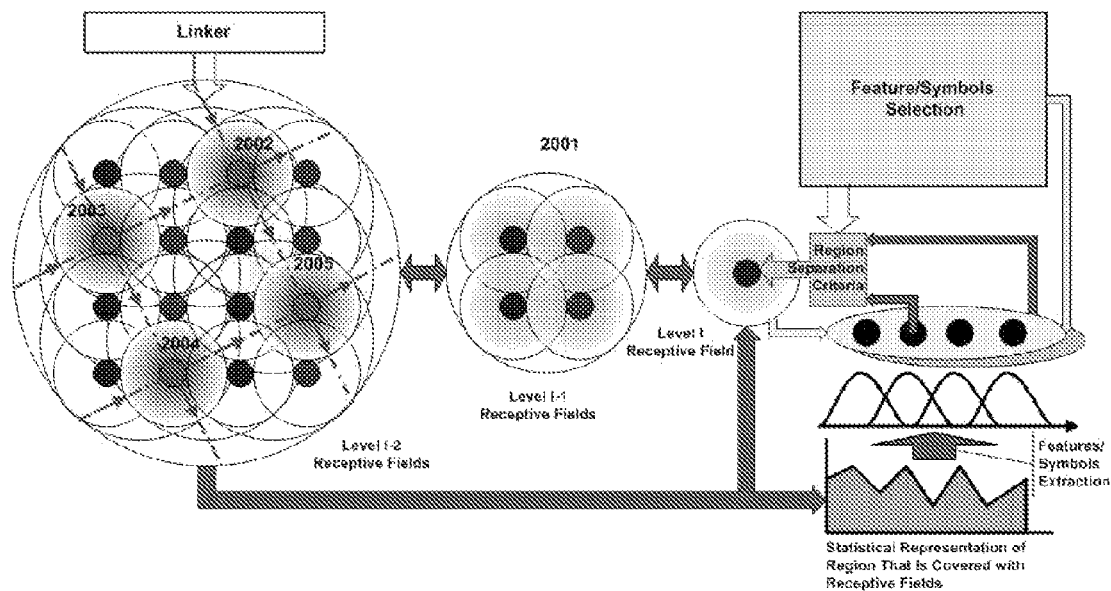
FIG. 20 is a diagram, illustrating method of processing textures in visual buffer.

FIG. 20 is a diagram, illustrating method of processing textures in visual buffer. In case of textures, receptive fields with selected features/symbols (2001) on a particular fine level might become disconnected. Anyway, linker will bind disconnected fields (2002,2003,2004,2005) with similar features/symbols into a coherent structure. This phenomenon is known as perceptual grouping. The pattern of binding is an important structural feature of a textured region, and it gives additional visual clue that allows visual system to separate distinctive textural regions. The level of grey in a receptive field shows a degree of presence in the area covered with the receptive field of a particular feature/symbol that is specified by the selection criteria. Arrows between the grayed receptive fields shows perceptual grouping of spatial elements with similar features/symbols into a coherent structure. The system of such coherent relations can help in the identification and separation of textured regions and similar spatial patterns.

Figure 21:
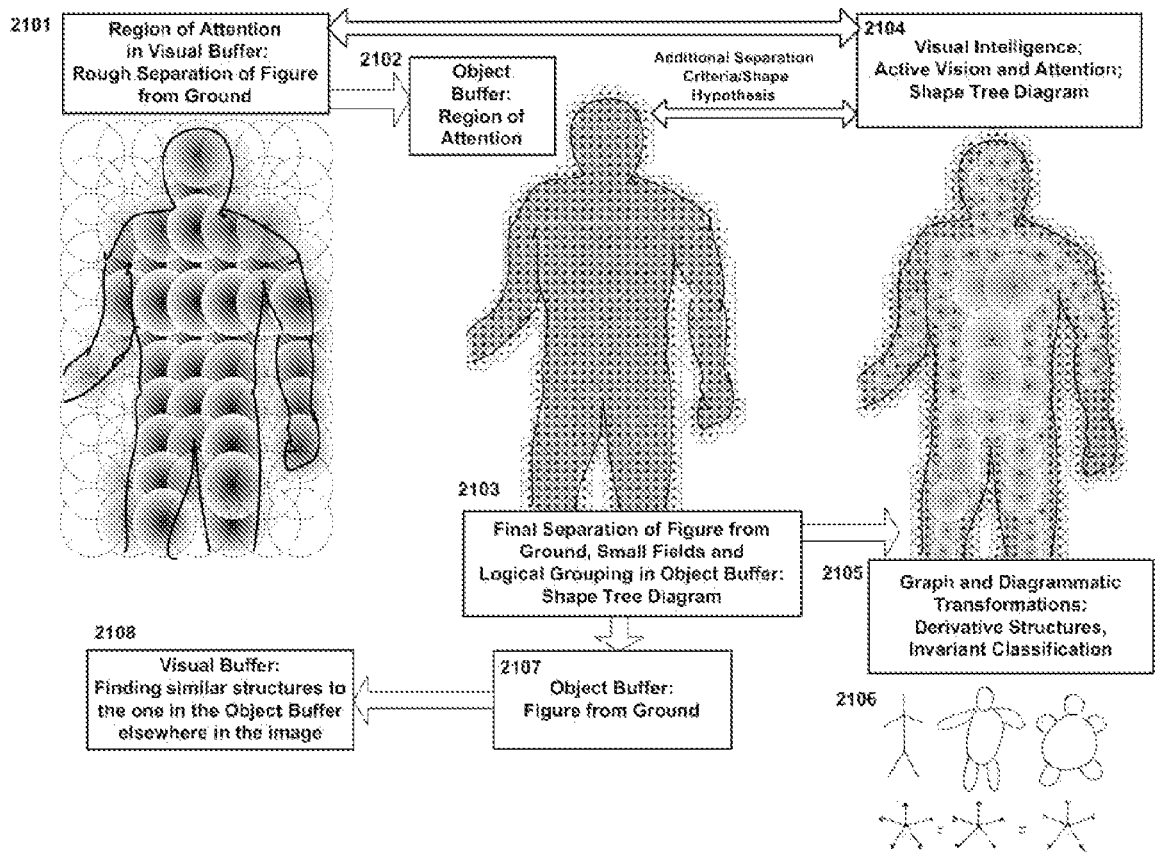
FIG. 21 is a diagram, illustrating process of interaction of visual and object buffer of presented invention.

FIG. 21 is a diagram, illustrating process of interaction of visual and object buffer of presented invention. Visual buffer (2101) contains large receptive fields. Some fields contain features that might be related to an object (shown in the levels of grey). The other fields do not have these features and can be treated as a background (shown white). They will be ignored in the further analysis of the object. At this point, it helps to find and narrow down initial region of interest and roughly separate figure from ground. Precise contour of object cannot be fully known at this phase. The black contour shows here a ground truth. When centered in the region of attention, the object appears in the object buffer (2102), and its fine representation of object buffer content with small receptive fields allows object completely be separated from its background (2103) with help of visual intelligence (2104) that provides additional separation criteria. Further logical grouping (2105) in Object Buffer derive a Shape Tree Diagram that with help of Graph and Diagrammatic Transformations can be converted into Derivative Structures (2106), and their invariant classification can be easily achieved. Object Buffer (2107) also demands finding similar structures to the one in the Object Buffer elsewhere in the visual buffer (2108).

Figure 22:
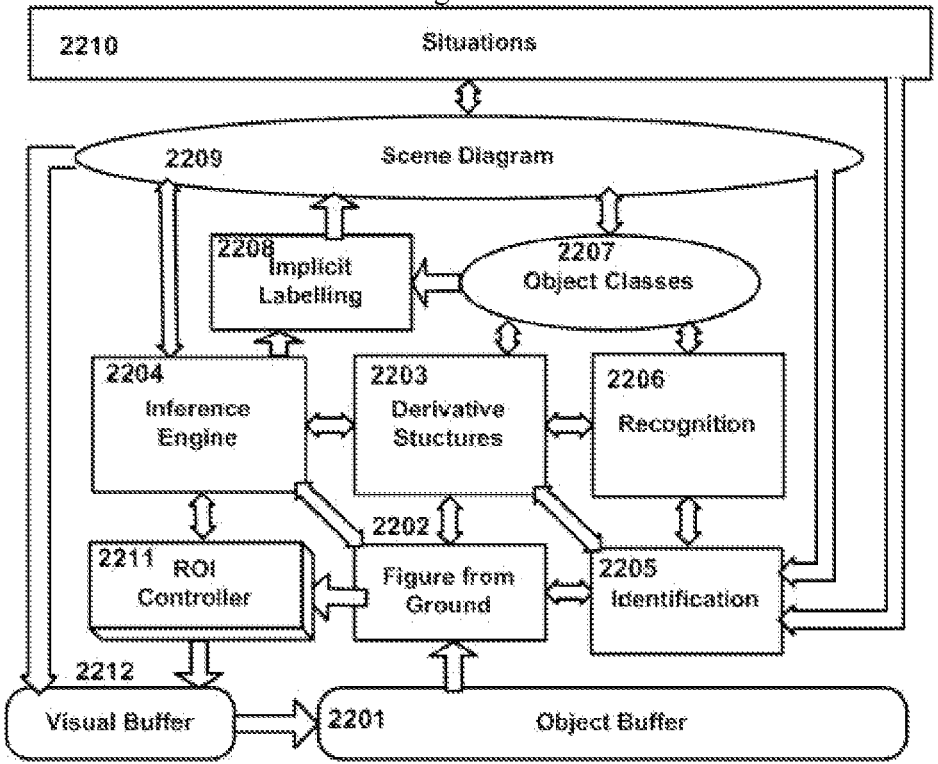
FIG. 22 is a diagram, illustrating method of processing visual information in the object buffer of the invention.

FIG. 22 is a diagram, illustrating method of processing visual information in the object buffer of the invention. Object buffer (2201) separates centered object (2202) from its background, and inference engine (2204) derives invariant structures (2203) from an object. These structures are subject for identification (2205) and recognition (2206) that identifies object classes (2207) used for implicit labeling (2208) of scene diagram (2209). Models of situations (2210) help to the process of identification, providing necessary context. ROI controller (2211) centers object in the object buffer, sending command to the visual buffer (2212).

Figure 23:
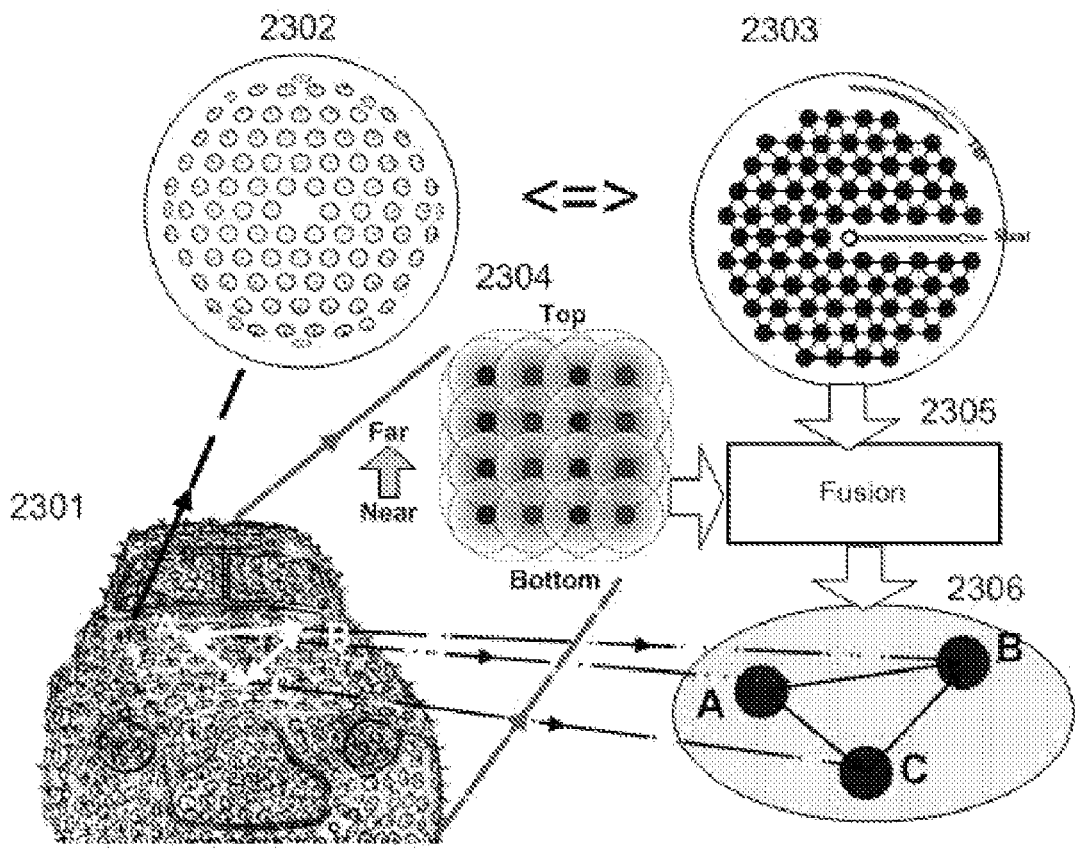
FIG. 23 is a diagram, illustrating method of processing of surfaces using fusion of local features and ecological constraints.

FIG. 23 is a diagram, illustrating method of processing of surfaces using fusion of local features and ecological constraints. The orientation of local surfaces (2301) can be measured with implicit alphabet of possible orientations (2302, 2303). Fusion (2305) with ecological constraints of visual scene (2304) helps to create visual surfaces in their discrete diagrammatic representation (2306), and they can be processed with means for diagrammatic and graph transformations.

Figure 24:
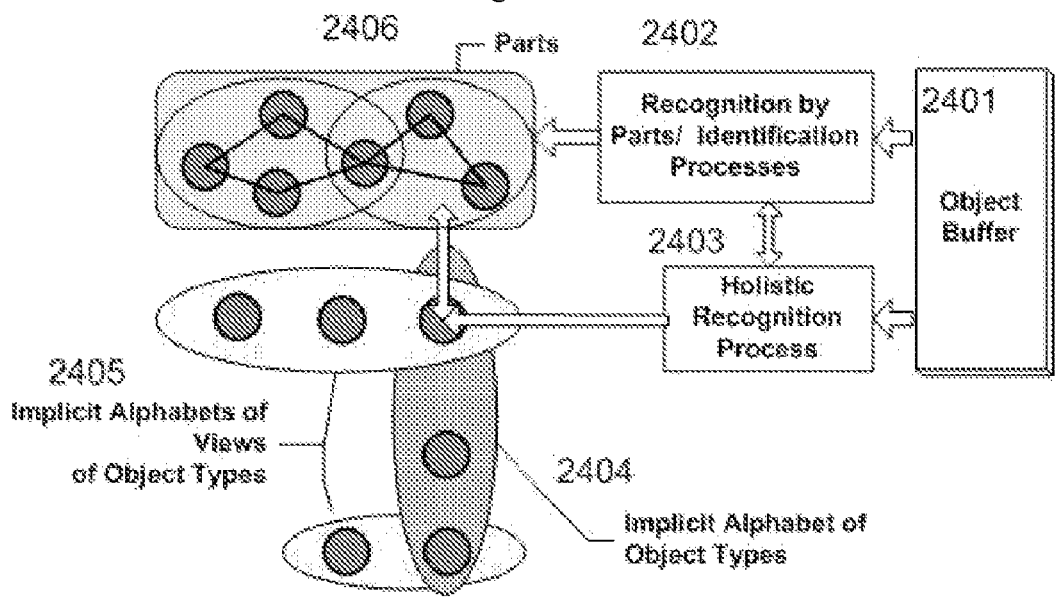
FIG. 24 is a diagram, illustrating interaction of processes of identification and recognition in terms of presented invention.

FIG. 24 is a diagram, illustrating interaction of processes of identification and recognition in terms of presented invention. The content of object buffer (2401) may be a subject of a holistic recognition (2403) and identification by parts (2402) if object is occluded. This is a recursive process, as a part can be processed in the same way. Recognition involves implicit alphabets of objects (2404) and their views (2405) that are associated with model structures consisting from parts (2406) of identified objects.

Figure 25:
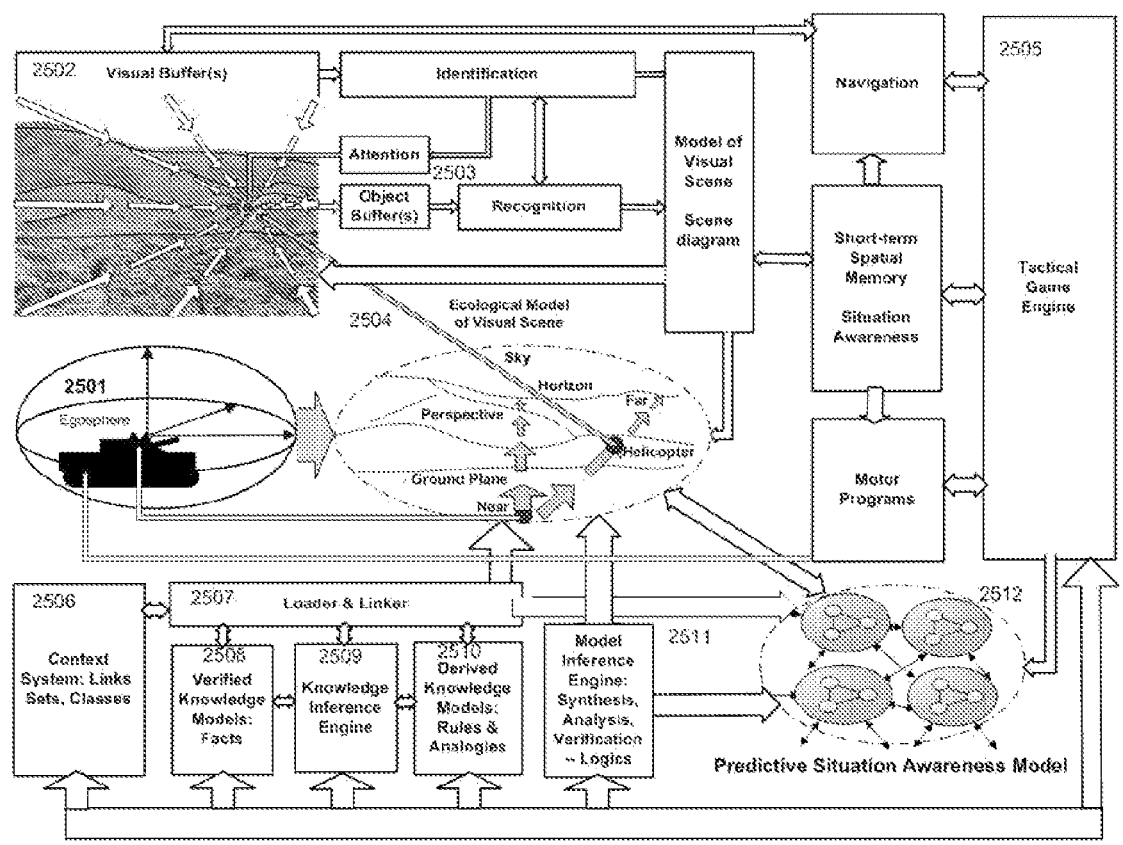
FIG. 25 is a diagram, illustrating an example of functioning presented invention as a full-scale real-world knowledge system embedded into control system of unmanned ground vehicle.

FIG. 25 is a diagram, illustrating an example of functioning presented invention as a full-scale real-world knowledge system embedded into control system of unmanned ground vehicle (2501). Instead of precise calculations of a 3-dimensional model of the visual scene, it construct a spatial relational structure of salient information from the visual buffer, using different depth cues with respect to the UGV or robot, which is placed in the center of "Egosphere." Recognition is achieved as interaction between visual (2502) and object buffers (2503) allows for the labeling of this structure with implicit symbols. Implicit labeling does not require explicit wording, and the semantic values are shown here only for a better explanation. Basic orientation lines extracted from the image are shown in black. The processes of identification of the spatial structure and recognition are interdependent. Recognition of a texture as "bushes" or another type of vegetation helps to "understand" surface as being of a particular type. Similarly, a surface can be treated as a "valley," and then the vegetation can be easier recognized as "bushes." An object, which suddenly popped up over the terrain, might not be recognized as a helicopter at the first moment. But its behavior and its position on the scene identify it as a helicopter, loading appropriate models and implicit alphabets for further recognition of the type of the helicopter and activation of appropriate reactive behavior. A similar logical mechanism works for spatial relations. Approximate distances are relative to the observer and to each other, and knowledge of some relative distances makes deriving other relative distances possible. The visual scene has a certain logic, which allow for using different cues in building knowledge structures from visual information. Once built, the scene diagram changes slower than local information in the visual buffers. This allows for the mapping of labels and distances back to the visual buffer via a set of closures, which disambiguates visual information for action control and navigation. (For the purpose of clarity, only one such closure for the helicopter object (2504) is explicitly shown on the current image. Such closures-links exist for other salient objects/regions, but the closures are not shown here.) Having the logic of a visual scene captured in the form of relational hierarchical network-symbolic structure and mapped back to the visual buffer, the UGV can derive relative locations of targets and other salient components of the scene and use it as a perceptual input for the Predictive Situation Awareness Model. All of this is possible, because the embedded semiotic engine emulates a full-scale real-world knowledge system (2505, 2506, 2507, 2508, 2509, 2510, 2511) that is also able to process perceptual information in real time. Tactical behaviors can be provided by a Tactical Game Engine (2505) that uses Predictive Situation Awareness Model (2512) and associated reactive behaviors to respond to dynamic situations, and can choose the right tactical behavior: to report, to hide, to call for support, or to attack.

REFERENCES

1. Technology Development for Army Unmanned Ground Vehicles, Committee on Army Unmanned Ground Vehicle Technology, National Research Council, National Academy Press, 2002
2. R. Sukthankarab, D. Pomerleaub, C. Thorpe, "A distributed tactical reasoning framework for intelligent vehicles", Proceedings of SPIE: Intelligent Systems and Advanced Manufacturing,
3. C. Schlenoff, T. Barbera, R. Washington, "Experiences in Developing an Intelligent Ground Vehicle (IGV) Ontoloping in Protege", Proceedings of the 7th International Protege Conference, Bethesda, Md., 2004.
4. MEL Programs at a Glance: Intelligent Control of Mobility Systems, http://www.mel.nist.gov/proj/bb05glanceweb.pdf
5. J. Sowa, Knowledge Representation. Brooks/Cole, 2000.
6. 4D/RCS: A reference model architecture for unmanned vehicle systems, Version 2, NISTIR 6910, NIST, 2002
7. J. Albus, A. Meystel, Engineering of Mind, Wiley & Sons, 2001.
8. J. Albus, A. Meystel, Intelligent Systems: Architecture, Design and Control, Wiley & Sons, 2001.
9. T. Caelli, W. Bischof, Machine Learning and Image Interpretation, Plenum Press, NY, 1997.
10. G. Sagerer, H. Niemann, Semantic Networks for Understanding Scenes. Plenum Press, NY, 1997.
11. Handbook of Graph Grammars and Computing by Graph Transformations. G. Rozenberg (Ed.), World Scientific, 1996.
12. Diagrammatic Reasoning. Cognitive and computational perspectives, J. Glasgow, N. Narayanan and B. Chandrasekaram. (Ed.), AAAI Press, 1995.
13. M. Minsky, The Society of Mind, McGraw-Hill 1975
14. M. Hershenson, Visual Space Perception, MIT Press, 1999.
15. J. Ferber, Multi-Agent Systems, Addison-Wesley, 1999.
16. D. Hoffman, Visual Intelligence, W. W. Norton, NY, 1998.
17. D. Marr, Vision, W. H. Freeman, New York, 1982.
18. Exploratory Vision. The Active Eye, M. Landy, L. Maloney, M. Pavel, (Ed.), Springer, N.Y., 1996.
19. L. S. Shapiro. Affine Analysis of Image Sequences, Cambridge University Press, 1995.
20. D. Forsysh, J. Ponce, Computer Vision. A modern Approach. Prentice Hall, 2003.
21. R. Dechter, Constraint Processing, Elsevier, 2003
22. Artificial intelligence and mobile robots, D. Kortenkamp, P. Bonasso, R. Murphy (Ed.) MIT Press, 1998.
23. H. Tsai, S. Balakirsky, E. Messina, M. Shneier, "A Hierarchical World Model for an Autonomous Scout Vehicle", Proc. SPIE, Vol. 4715, 2002.
24. Introduction to MPEG-7. Multimedia Content Description Interface, B. S. Manjunas, P. Salambier, T. Sicora (Ed.), Wiley, New York, 2002.
25. T. S. Lee, D. Mumford, R. Romero, V. Lamme, "The role of the primary visual cortex in higher level vision", Vision Research 38, Pergamon Press, 1998.
26. D. H. Hubel, Eye, Brain, and Vision, Scientific American Library, NY, 1988.
27. S. W. Zucker, "Which computation runs in Visual Cortical Columns?", Problems in Systems Neuroscience, J. Hemmen, T. Sejnowski (eds.), Oxford University Press.
28. L. Zhaoping, "VI mechanisms and some figure-ground and border effects", Journal of Psychology, Paris 2003.
29. N. Swindale, "Cortical organization: Modules, polymaps and mosaics", Current Biology, Apr. 9, 1998.
30. C. Kayser, K. Kording, P. Konig, "Processing of complex stimuli and natural scenes in the visual cortex", Current opinion in Neurobiology 14(4), 2004.
31. B. Curuclu, A. Lansner, "An abstract model of a cortical hypercolumn", in Proc. of $9^{th}$ International Conf. on Neural Information Processing, Singapore 2002.
32. L. A. Zadeh, The concept of a linguistic variable and its application to approximate reasoning, American Elsevier Publishing Co, New York, 1973.
33. S. Kosslyn, Image and Brain, Cambridge, Mass. MIT Press 1994.
34. D. Zhang, G. Lu, "Review of shape representation and description techniques", Journal of Pattern Recognition 37 (2004), Pergamon Press
35. L. S. Shapiro. Affine Analysis of Image Sequences, Cambridge University Press, 1995.
36. 39. J. Gibson, The Ecological Approach to Visual Perception, LEA, Hillsdale, N.J., 1986
37. C. v. d. Malsburg, "Binding in Models of Perception and Brain Function," Current Opinion in Neurobiology 5, 1995.
38. L. Shastri, "A Model of Rapid Memory Formation in the Hippocampal System," Proceedings of the Nineteenth Annual Conference of the Cognitive Science Society, pp. 680-685, Stanford University, CA, 1997.
39. Diagrammatic Reasoning. Cognitive and computational perspectives, J. Glasgow, N. Narayanan and B. Chandrasekaram. (Ed.), AAAI Press, 1995.
40. J. Sowa, Knowledge Representation. Brooks/Cole, 2000.
41. R. Rojas, Neural Networks. A systematic approach, Springer-Verlag, 1996.
42. T. Kohonen, Self-Organizing Maps, Springer Series In Information Sciences, 1997.
43. M. Riesenhuber, T. Poggio, "Hierarchical Models of Object Recognition in Cortex", Nature Neuroscience 2, 1999.

What is claimed:

1. An active semiotic system for image and video understanding by autonomous robots and unmanned vehicles to provide better situation awareness and intelligent tactical behavior in real world situations, the active semiotic system comprising:
   a plurality of sensor and active vision controllers that obtain visual information corresponding to a visual scene in real world situations;
   a visual information processor that processes the visual information into semiotic form;
   a semiotic engine comprising: a linker that generates active diagrammatic models of the visual scene in accordance with the visual information processed into semiotic form; a plurality of derivation engines that transform the active diagrammatic models into higher-level active diagrammatic models using graphs and diagrammatic information and that identify object classes within the visual scene; a plurality of knowledge acquisition engines that convert information from other formats into internal representations corresponding to the active diagrammatic models; a memory that stores the active diagrammatic models as a plurality of implicit symbols and their alphabets and a plurality of diagrams and reference links; a loader that loads the plurality of implicit symbols and their alphabets and the plurality of diagrams and reference links into the memory; a plurality of recognition engines that recognize the implicit symbols stored in the memory; and an activation manager that controls the plurality of implicit symbols and their alphabets and the plurality of diagrams and reference links stored in the memory; and a behavior planning services module that predicts and plans a course of action in accordance with the active diagrammatic models and that communicates the course of action to control systems of autonomous robots or unmanned systems for situation awareness and intelligent tactical behavior in real world situations.

2. An active semiotic system according to claim 1; wherein the derivation engines of the semiotic engine derive regularities from the active diagrammatic models and compress the regularities into active diagrams for emulation of mid-level vision processes and for further high-level intelligent processing.

3. An active semiotic system according to claim 2; wherein the recognition engines recognize regular patterns and obtain the implicit symbols from perceptual information or from within the active diagrams.

4. An active semiotic system according to claim 2; wherein regular structures are associated with the respective implicit symbols.

5. An active semiotic system according to claim 1; wherein at least one of the implicit symbols represents a pattern that can be obtained as a solution to a local pattern recognition problem with a finite number of possible patterns.

6. An active semiotic system according to claim 1; wherein at least one of the implicit symbols represents a structure within the corresponding active diagrammatic models.

7. An active semiotic system according to claim 6; wherein at least one of the alphabets of the corresponding implicit symbols represents a set containing a finite number of possible patterns.

8. An active semiotic system according to claim 6; wherein at least one of the alphabets of the corresponding implicit symbols represents a set containing the structures within the corresponding active diagrammatic models.

9. An active semiotic system according to claim 1; wherein the derivation engines dynamically create or derive new implicit symbols and corresponding alphabets and new diagrammatic models.

10. An active semiotic system according to claim 1; wherein the derivation engines dynamically modify existing implicit symbols and corresponding alphabets and new diagrammatic models.

11. An active semiotic system according to claim 1; wherein the visual information processor comprises:

a plurality of visual buffers that process the visual information generated by the semiotic system at the level of the entire visual scene, the semiotic engine creating abstract knowledge models corresponding to the processed visual information and mapping known visual constraints of the created abstract knowledge models back to the visual buffers; and a plurality of object buffers that process a selected subset of the visual information processed by the visual buffers, the subset of the visual information appearing within a region of interest (ROT) within the visual scene at a finer level for recognition by the recognition engines and identification by the derivation engines of object classes for labeling of the active diagrammatic models of the visual scene.

12. An active semiotic system according to claim 11; further comprising an ROI controller that centers part of the visual information in the visual scene in the object buffers for extraction of the subset of the visual information.

13. An active semiotic system according to claim 12; wherein the part of the visual information centered by the ROI controller corresponds to an object that is separated from a background of the visual scene; and wherein the derivation engines comprise an inference engine that derives the active diagrammatic models from the separated object for invariant classification of the object via matching of the active diagrammatic models thereof by the derivation engines or for recognition thereof by the recognition engines.

14. An active semiotic system according to claim 13; wherein the linker maps symbols of the object classes to the active diagrammatic models of the visual scene.

15. An active semiotic system according to claim 14; wherein the semiotic engine maps to the visual buffers the active diagrammatic models of the visual scene to which the symbols of the object classes are mapped to provide understanding of the content of the visual buffers by the unmanned vehicles or autonomous robots.

16. An active semiotic system according to claim 15; wherein the subset of visual information in the object buffers is used by the recognition engines for recognizing similar subsets in the visual buffers to facilitate processing by the linker of similarities and textures in the entire visual scene in the visual buffers by linking similar features expressed with symbols thereof into coherent structures within the active diagrammatic models for the identification of rigid bodies and textured regions in the visual scene.

17. An active semiotic system according to claim 15; wherein the derivation engines identify the object classes in accordance with the active diagrammatic models of the visual scene to which the symbols of the object classes are mapped to provide necessary visual constraints of information contained in the visual scene, the information in the visual buffers being processed with a set of the visual constraints that allows for interpretation of the content of the visual buffers as a visual description of a three-dimensional world in the form of a diagrammatic structure with assigned relative distances and proportions, the set of visual constraints being mapped back to the visual buffers by the semiotic engine.

18. An active semiotic system according to claim 13; wherein the behavior planning services module comprises: a plurality of behavior request controllers that communicate with control systems of the unmanned vehicles or autonomous robots by requesting behavior actions or navigation information for tracking objects; a tactical game engine that obtains necessary information from the visual buffers and active diagrammatic models to provide tactical behaviors and associated reactive behaviors to respond to dynamic situations in the visual scene;

and a situation awareness controller that communicates with the control systems of the unmanned vehicles or autonomous robots, controls switching of the ROI, tracks the objects in the visual buffers to allow centering of the part of the visual information in the visual scene with respect to a center of the tracked objects, and places the centered part of the visual information in the visual scene into the object buffers for processing of the tracked objects.

19. An active semiotic system for image and video understanding by autonomous robots and unmanned vehicles to provide better situation awareness and intelligent tactical behavior in real world situations, the active semiotic system comprising:
   means for obtaining visual information corresponding to a visual scene in real world situations;
   means for processing the visual information into semiotic form;
   means for generating active diagrammatic models of the visual scene in accordance with the visual information processed into semiotic form;
   means for transforming the active diagrammatic models into higher-level active diagrammatic models using graphs and diagrammatic information and for identifying object classes within the visual scene;
   means for converting information from other formats into internal representations corresponding to the active diagrammatic models;
   means for storing the active diagrammatic models as a plurality of implicit symbols and their alphabets and a plurality of diagrams and reference links;
   means for recognizing the stored implicit symbols;
   means for controlling the stored plurality of implicit symbols and their alphabets and the plurality of diagrams and reference links; and
   means for predicting and planning a course of action in accordance with the active diagrammatic models and for communicating the course of action to control systems of autonomous robots or unmanned systems for situation awareness and intelligent tactical behavior in real world situations.

20. An active semiotic system according to claim 19; wherein the means for transforming derive regularities from the active diagrammatic models and compress the regularities into active diagrams for emulation of mid-level vision processes and for further high-level intelligent processing and wherein the means for recognizing recognizes regular patterns and obtains the implicit symbols from perceptual information or from within the active diagrams.

21. An active semiotic system according to claim 19; wherein at least one of the implicit symbols represents a pattern that can be obtained as a solution to a local pattern recognition problem with a finite number of possible patterns or represents a structure within the corresponding active diagrammatic models.

22. An active semiotic system according to claim 21; wherein at least one of the alphabets of the corresponding implicit symbols represents a set containing a finite number of possible patterns.

23. An active semiotic system according to claim 21; wherein at least one of the alphabets of the corresponding implicit symbols represents a set containing the structures within the corresponding active diagrammatic models.

24. An active semiotic system according to claim 19; wherein the means for transforming dynamically creates or derives new implicit symbols and corresponding alphabets and new diagrammatic models.

25. An active semiotic system according to claim 19; wherein the means for transforming dynamically modify existing implicit symbols and corresponding alphabets and new diagrammatic models.

26. An active semiotic system according to claim 19; wherein means for processing includes first processing means for processing the visual information at the level of the entire visual scene; and further comprising means for creating abstract knowledge models corresponding to the processed visual information and for mapping known visual constraints of the created abstract knowledge models back to the first means for processing.

27. An active semiotic system according to claim 26; wherein the means for processing includes second processing means for processing a selected subset of the visual information processed by the first processing means, the selected subset of the visual information appearing within a region of interest (ROI) within the visual scene at a finer level for recognition by the means for recognizing and identification by the means for derivation engines of object classes for labeling of the active diagrammatic models of the visual scene.

28. An active semiotic system according to claim 27; further comprising means for centering part of the visual information in the visual scene in the second processing means for extraction of the subset of the visual information; wherein the part of the visual information centered by means for centering corresponds to an object that is separated from a background of the visual scene; and wherein the means for transforming comprises means for deriving the active diagrammatic models from the separated object for invariant classification of the object via matching of the active diagrammatic models thereof by the means for transforming or for recognition thereof by the means for recognizing engines.

29. An active semiotic system according to claim 28; wherein the means for generating maps symbols of the object classes to the active diagrammatic models of the visual scene.

30. An active semiotic system according to claim 28; further comprising means for mapping to the first processing means the active diagrammatic models of the visual scene to which the symbols of the object classes are mapped to provide understanding of the content of the first processing means by the unmanned vehicles or autonomous robots; wherein the subset of visual information in the second processing means is used by the means for recognizing for recognizing similar subsets in the first processing means to facilitate processing by the means for generating of similarities and textures in the entire visual scene in the first processing means by linking similar features expressed with symbols thereof into coherent structures within the active diagrammatic models for the identification of rigid bodies and textured regions in the visual scene; and wherein the means for transforming identifies the object classes in accordance with the active diagrammatic models of the visual scene to which the symbols of the object classes are mapped to provide necessary visual constraints of information contained in the visual scene, the information in the first processing means being processed with a set of the visual constraints that allows for interpretation of the content of the first processing means as a visual description of a three-dimensional world in the form of a diagrammatic structure with assigned relative distances and proportions; and further comprising means for mapping the set of visual constraints back to the first processing means.

31. An active semiotic system according to claim 30; wherein the means for predicting and planning comprises: first means for communicating with the control systems of the unmanned vehicles or autonomous robots by requesting behavior actions or navigation information for tracking objects; means for acquiring necessary information from the first processing means and the active diagrammatic models to provide tactical behaviors and associated reactive behaviors to respond to dynamic situations in the visual scene; and second means for communicating with the control systems of the unmanned vehicles or autonomous robots, controlling switching of the means for centering the part of the visual information in the visual scene, tracking the objects in the first processing means to allow centering of the part of the visual information in the visual scene with respect to a center of the tracked objects, and placing the centered part of the visual information in the visual scene into the second processing means for processing of the tracked objects.

32. A computer-implemented method of active semiotics for image and video understanding by autonomous robots and unmanned vehicles to provide better situation awareness and intelligent tactical behavior in real world situations, the method comprising the steps of:

obtaining visual information corresponding to visual scenes in real world situations;

processing the visual information into semiotic form;

generating active diagrammatic models in accordance with the visual information in semiotic form;

storing the active diagrammatic models as a plurality of implicit symbols and their alphabets and a plurality of diagrams and reference links;

transforming the active diagrammatic models into higher-level active diagrammatic models using graphs and diagrammatic information and identifying object classes within the visual scenes;

recognizing the implicit symbols stored in the memory;

converting information from other formats into internal representations corresponding to the active diagrammatic models; and predicting and planning a course of action in accordance with the active diagrammatic models and communicating the course of action to control systems of autonomous robots or unmanned systems for situation awareness and intelligent tactical behavior in real world situations.

33. A method according to claim 32; further comprising the steps of deriving regularities from the active diagrammatic models and compressing the regularities into active diagrams for emulation of mid-level vision processes and for further high-level intelligent processing; and wherein the recognizing step comprises recognizing regular patterns and obtaining the implicit symbols from perceptual information or from within the active diagrams.

34. A method according to claim 32; wherein at least one of the implicit symbols represents a pattern that can be obtained as a solution to a local pattern recognition problem with a finite number of possible patterns.

35. A method according to claim 32; wherein at least one of the implicit symbols represents a structure within the corresponding active diagrammatic models; and wherein at least one of the alphabets of the corresponding implicit symbols represents a set containing a finite number of possible patterns or a set containing the structures within the corresponding active diagrammatic models.

36. A method according to claim 32; further comprising the step of dynamically creating or deriving new implicit symbols and corresponding alphabets and new diagrammatic models.

37. A method according to claim 32; further comprising the step of dynamically modify existing implicit symbols and corresponding alphabets and new diagrammatic models.

38. A method according to claim 32; wherein the step of processing the visual information comprises the steps of: processing by visual buffers the visual information at the level of an entire visual scene, and further comprising the step of creating abstract knowledge models corresponding to the processed visual information and mapping known visual constraints of the created abstract knowledge models back to the visual buffers; and processing by object buffers a selected subset of the visual information processed by the visual buffer, the subset of the visual information appearing within a region of interest or attention within the visual scene at a finer level for recognition and identification of object classes for labeling of the active diagrammatic models of the visual scene.

39. A method according to claim 38; further comprising the steps of centering a part of the visual information in the visual scene for extraction of the subset of the visual information, the centered part of the visual information corresponding to an object that is separated from a background of the visual scene, and deriving the active diagrammatic models from the separated object for invariant classification of the separated object.

40. A method according to claim 39; further comprising the steps of: mapping symbols of the object classes to the active diagrammatic models of the visual scene; and mapping the active diagrammatic models of the visual scene to which the symbols of the object classes are mapped to provide understanding of the content of the visual buffers by the unmanned vehicles or autonomous robots.

41. A method according to claim 40; wherein the subset of visual information in the object buffers is used for recognizing similar subsets in the visual buffers to facilitate processing of similarities and textures in the entire visual scene in the visual buffers by linking similar features expressed with symbols thereof into coherent structures within the active diagrammatic models for the identification of rigid bodies and textured regions in the visual scene; and further comprising the step of identifying the object classes in accordance with the active diagrammatic models of the visual scene to which the symbols of the object classes are mapped to provide necessary visual constraints of information that may be contained in a particular visual scene, and processing the information with a set of the visual constraints that allows for interpretation of the content of the visual buffers as a visual description of a three-dimensional world in the form of a diagrammatic structure with assigned relative distances and proportions; and further comprising the step of mapping the set of the visual constraints back to the visual buffers.

42. A method according to claim 41; further comprising the steps of communicating a plurality of behavior request controllers with the control systems of the unmanned vehicles or autonomous robots by requesting behavior actions or navigation information for tracking objects, obtaining necessary information from the active diagrammatic models to provide tactical behaviors and associated reactive behaviors to respond to dynamic situations in the visual scene, communicating a situation awareness controller with the control systems of the unmanned vehicles or autonomous robots to control switching of the region of interest, tracking the objects to allow centering of the part of the visual information in the visual scene with respect to a center of the tracked object, and placing the centered part of the visual information in the visual scene into the object buffers for processing of the tracked objects.

43. A computer program product comprising a computer-readable medium having computer program instructions and data embodied thereon for a method of active semiotics for image and video understanding by autonomous robots and unmanned vehicles to provide better situation awareness and intelligent tactical behavior in real world situations, the method comprising:

obtaining visual information corresponding to visual scenes in real world situations;

processing the visual information into semiotic form;

generating active diagrammatic models in accordance with the visual information in semiotic form;

storing the active diagrammatic models as a plurality of implicit symbols and their alphabets and a plurality of diagrams and reference links;

transforming the active diagrammatic models into higher-level active diagrammatic models using graphs and diagrammatic information and identifying object classes within the visual scenes;

recognizing the implicit symbols stored in the memory;

converting information from other formats into internal representations corresponding to the active diagrammatic models; and predicting and planning a course of action in accordance with the active diagrammatic models and communicating the course of action to control systems of autonomous robots or unmanned systems for situation awareness and intelligent tactical behavior in real world situations.

44. A computer program product according to claim 43; further comprising deriving regularities from the active diagrammatic models and compressing the regularities into active diagrams for emulation of mid-level vision processes and for further high-level intelligent processing; and wherein the recognizing of the implicit symbols comprises recognizing regular patterns and obtaining the implicit symbols from perceptual information or from within the active diagrams.

45. A computer program product according to claim 43; wherein at least one of the implicit symbol represents a structure within the corresponding active diagrammatic models; and wherein each of the alphabets of the corresponding implicit symbols represents a set containing a finite number of possible patterns or a set containing the structure within the corresponding active diagrammatic models.

46. A computer program product according to claim 43; wherein the processing of the visual information comprises: processing by visual buffers the visual information at the level of an entire visual scene; creating abstract knowledge models corresponding to the processed visual information and mapping known visual constraints of the created abstract knowledge models back to the visual buffers; and processing by object buffers a selected subset of the visual information processed by the visual buffer, the subset of the visual information appearing within a region of interest or attention within the visual scene at a finer level for recognition and identification of object classes for labeling of the active diagrammatic models of the visual scene.

47. A computer program product according to claim 46; further comprising centering a part of the visual information in the visual scene for extraction of the subset of the visual information, the centered part of the visual information corresponding to an object that is separated from a background of the visual scene, and deriving the active diagrammatic models from the separated object for invariant classification of the separated object.

48. A computer program product according to claim 47; further comprising mapping symbols of the object classes to the active diagrammatic models of the visual scene and mapping the active diagrammatic models of the visual scene to which the symbols of the object classes are mapped to provide understanding of the content of the visual buffers by the unmanned vehicles or autonomous robots.

49. A computer program product according to claim 48; wherein the subset of visual information in the object buffers is used for recognizing similar subsets in the visual buffers to facilitate processing of similarities and textures in the entire visual scene in the visual buffers by linking similar features expressed with symbols thereof into coherent structures within the active diagrammatic models for the identification of rigid bodies and textured regions in the visual scene; and further comprising the step of identifying the object classes in accordance with the active diagrammatic models of the visual scene to which the symbols of the object classes are mapped to provide necessary visual constraints of information that may be contained in a particular visual scene, and processing the information with a set of the visual constraints that allows for interpretation of the content of the visual buffers as a visual description of a three-dimensional world in the form of a diagrammatic structure with assigned relative distances and proportions; and further comprising the step of mapping the set of the visual constraints back to the visual buffers.

50. A computer program product according to claim 49; further comprising the steps of communicating a plurality of behavior request controllers with the control systems of the unmanned vehicles or autonomous robots by requesting behavior actions or navigation information for tracking objects, obtaining necessary information from the active diagrammatic models to provide tactical behaviors and associated reactive behaviors to respond to dynamic situations in the visual scene, communicating a situation awareness controller with the control systems of the unmanned vehicles or autonomous robots to control switching of the region of interest, tracking the objects to allow centering of the part of the visual information in the visual scene with respect to a center of the tracked object, and placing the centered part of the visual information in the visual scene into the object buffers for processing of the tracked objects.

* * * * *